(12) United States Patent
Masuda

(10) Patent No.: US 8,131,761 B2
(45) Date of Patent: Mar. 6, 2012

(54) FILE MANAGEMENT SYSTEM AND APPARATUS, AND COMPUTER READABLE RECORDING MEDIUM STORING PROGRAM

(75) Inventor: Takahiro Masuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 245 days.

(21) Appl. No.: 12/646,260

(22) Filed: Dec. 23, 2009

(65) Prior Publication Data

US 2010/0100574 A1 Apr. 22, 2010

Related U.S. Application Data

(63) Continuation of application No. PCT/JP2007/063560, filed on Jul. 6, 2007.

(51) Int. Cl.
*G06F 17/30* (2006.01)

(52) U.S. Cl. ........ 707/781; 707/782; 707/783; 707/784; 707/785; 707/788; 707/802

(58) Field of Classification Search .......... 707/781–788, 707/802
See application file for complete search history.

(56) References Cited

U.S. PATENT DOCUMENTS 6,862,603 B1 * 3/2005 Nakajima et al. ................ 1/1
2003/0105776 A1 * 6/2003 Hasuo et al. .................. 707/200

FOREIGN PATENT DOCUMENTS

| JP | 9-223130 | 8/1997 |
|---|---|---|
| JP | 2002-7217 | 1/2002 |
| JP | 2005-275480 | 10/2005 |
| JP | 2007-34651 | 2/2007 |
| WO | WO 2007/072646 | 6/2007 |

OTHER PUBLICATIONS

Filip et al. International journal of computers, communications and control, vol. 2, 110 pages.*

* cited by examiner

*Primary Examiner* — John R. Cottingham
*Assistant Examiner* — Noosha Arjomandi
(74) *Attorney, Agent, or Firm* — Staas & Halsey LLP

(57) ABSTRACT

By having a file data storage section that stores file data of a file; a management information storage section that stores management information identifying the file, the management information being related to the file data; a control information storage section that stores control information on a file to be blocked on which a predefined specified processing is to be executed; a management information retrieval section that retrieves the management information stored in the management information storage section; a control information retrieval section that retrieves the control information stored in the control information storage section; an execution section that, when the management information retrieved by the management information retrieval section corresponds to the control information retrieved by the control information retrieval section, executes the predefined processing on the file data related to that management information, proliferation of an important file distribution of which should be restricted over a network can be restricted.

15 Claims, 17 Drawing Sheets

FIG. 7

| NUMBER | SPECIFIED PROCESSING NAME | DESCRIPTION OF SPECIFIED PROCESSING | OPTIONS |
|---|---|---|---|
| 1 | DELETION | DELETE | NONE |
| 2 | READ | CHANGE READ ATTRIBUTE OR THE LIKE | ATTRIBUTE AFTER CHANGE |
| 3 | REPORT | REPORT BY SENDING MAIL TO PREDETERMINED ADDRESS | ADDRESS | b1

FIG. 8

| NUMBER | COMPARISON PROCESSING NAME | DESCRIPTION OF COMPARISON PROCESSING | OPTIONS |
|---|---|---|---|
| 1 | LATEST MATCH | COMPARE BETWEEN $0^{TH}$ GEN MANAGEMENT SUMMARY INFO AND $0^{TH}$ GEN CONTROL SUMMARY INFO | NONE |
| 2 | LATEST MATCH <br> +INHERITED MATCH | ADDITION TO THE ABOVE, COMPARE BETWEEN ONE OF $1^{ST}$ TO $n^{TH}$ GEN MANAGEMENT SUMMARY INFO AND $0^{TH}$ GEN CONTROL SUMMARY INFO | NONE |
| 3 | LATEST MATCH <br> +INHERITED MATCH <br> +PAST MATCH | ADDITION TO THE ABOVE, COMPARE BETWEEN $0^{TH}$ GEN MANAGEMENT SUMMARY INFO AND ONE OF $1^{ST}$ TO $m^{TH}$ GEN CONTROL SUMMARY INFO | NONE |
| 4 | LATEST MATCH <br> +INHERITED MATCH <br> +PAST MATCH <br> +COMMON ANCESTOR MATCH | ADDITION TO THE ABOVE, COMPARE BETWEEN ONE OF $1^{ST}$ TO $n^{TH}$ GEN MANAGEMENT SUMMARY INFO AND ONE OF $1^{ST}$ TO $m^{TH}$ GEN CONTROL SUMMARY INFO | NONE | b2

FIG. 9

| NUMBER | VALID LIMIT INFO | DESCRIPTION OF VALID PERIOD | OPTIONS |
|---|---|---|---|
| 1 | W/O SETTING | NEITHER VALID PERIOD NOR VALID COUNT IS SET | NONE |
| 2 | DUE DATE | VALID UNTIL DUE DATE THAT IS SET | DUE DATE TO BE SET |
| 3 | DURATION | VALID DURING DURATION THAT IS SET | DURATION TO BE SET |
| 4 | COUNT | VALID UNTIL COUNT THAT IS SET IS REACHED | COUNT TO BE SET | b3

FIG. 10

| COMPARISON ORDER | CONTROL SUMMARY INFO | MANAGEMENT SUMMARY INFO |
|---|---|---|
| 1 | 0$^{TH}$ GEN CONTROL SUMMARY INFO | 0$^{TH}$ GEN MANAGEMENT SUMMARY INFO |
| 2 | 0$^{TH}$ GEN CONTROL SUMMARY INFO | 1$^{ST}$ GEN AND LATER MANAGEMENT SUMMARY INFO |
| 3 | 1$^{ST}$ GEN AND LATER CONTROL SUMMARY INFO | 0$^{TH}$ GEN MANAGEMENT SUMMARY INFO |
| 4 | 1$^{ST}$ GEN AND LATER CONTROL SUMMARY INFO | 1$^{ST}$ GEN AND LATER MANAGEMENT SUMMARY INFO |

| NUMBER | TYPE | DESCRIPTION OF PROCESSING | OPTIONS |
|---|---|---|---|
| 1 | IMMEDIATE DELETION | IMMEDIATELY DELETE FILE THAT IS SENT | NONE |
| 2 | READ | CHANGE READ ATTRIBUTE OR THE LIKE | ATTRIBUTE AFTER CHANGE |
| 3 | REPORT | REPORT BY SENDING MAIL TO PREDETERMINED ADDRESS | ADDRESS |
| 4 | SENDER DELETION | IMMEDIATELY DELETE ORIGINAL FILE THAT IS SENT | NONE |
| 5 | SENDER DELAYED DELETION | TEMPORALLY ACCUMULATE INFO THAT CAN IDENTIFY ORIGINAL FILES THAT ARE SENT INTO LOG AND ENABLE DELETION OF FILES AT A TIME, SUCH AS MANUALLY OR BY MEANS OF BATCH PROCESSING | NONE | b1'

FIG. 17

| FILE NAME | GEN COUNT | KEY WORD | ACTUAL DIGEST SEQUENCE······ | | |
|---|---|---|---|---|---|
| CONFIDENTIAL.DOC | 3 | NEW PRODUCT X | AA C3 29 18 ... | 52 1F 7C 66 ... | 00 22 77 BF ... |

FILE MANAGEMENT SYSTEM AND APPARATUS, AND COMPUTER READABLE RECORDING MEDIUM STORING PROGRAM

CROSS-REFERENCE TO RELATED APPLICATION

This application is a continuation Application of a PCT international application No. PCT/JP2007/063560 filed on Jul. 6, 2007 in Japan, the entire contents of which are incorporated by reference.

FIELD

The embodiment discussed herein relates to a technique for managing files, for example, relates to a technique that is preferably used upon managing important files distribution of which over a network, such as the Internet, intranets, extranets, LANs (Local Area Networks), should be restricted.

BACKGROUND

In general, files having digital data, such as documents, images, pictures, sounds, can be easily exchanged between a plurality of computers connected to a network, such as the Internet, intranets, extranets, LAN (Local Area Network).

Such files may include important files that are highly confidential and the distribution of which over the network should be restricted, such as personal information (hereinafter, refereed to as "confidential files"). Proliferation (leakage, leak) of such confidential files over the network should be prevented.

For this purpose, various techniques for preventing proliferation of confidential files over networks have been adapted.

For example, Cited Reference 1 listed below discloses a technique in which a file handles data elements as objects, the technique allows or prohibits usage of each object, and distributes the file by deleting objects under certain circumstances.

Furthermore, Cited Reference 2 listed below discloses a technique in which, when an electronic file to be written or sent in or to an external medium (another terminal) is determined as a personal information file, writing/transmission of that personal information file is prohibited, or the personal information file is written or sent in or to the external medium (another terminal) after the personal information file is converted into an encrypted file.

Patent Document 1: Japanese Laid-Open Patent Application No. 2002-007217

Patent Document 2: Japanese Laid-Open Patent Application No. 2007-034651

SUMMARY

However, in the above-identified Cited References 1 and 2, if a confidential file is leaked over a network accidentally or due to a user's negligence, proliferation of the confidential file over the network cannot be deterred. For example, even when a request is made to the recipient of the confidential file, asking him to delete the confidential file, whether the file is actually deleted or not is dependent on the receiver.

Furthermore, although intrusion of an unauthenticated program, e.g., a virus, can be prevented by using a protection system, such as a firewall, proliferation of confidential files in which no unauthenticated program is contained cannot be blocked.

In order to achieve the above-identified object, a file management system of the embodiment includes a file management system comprising a file data storage section that stores file data of a file; a management information storage section that stores management information identifying the file, the management information being related to the file data; a control information storage section that stores control information on a file to be blocked on which a predefined specified processing is to be executed; a management information retrieval section that retrieves the management information stored in the management information storage section; a control information retrieval section that retrieves the control information stored in the control information storage section; and an execution section that, when the management information retrieved by the management information retrieval section corresponds to the control information retrieved by the control information retrieval section, executes the predefined processing on the file data related to that management information, wherein the management information retrieval section retrieves, when the control information is added in the control information storage section, all of the management information stored in the management information storage section, the control information retrieval section retrieves, when the control information is added in the control information storage section, the added control information, and the execution section sequentially compares between the management information retrieved by the management information retrieval section and the control information retrieved by the control information retrieval section.

In addition, a file management apparatus of the embodiment includes a file data storage section that stores file data of a file; a management information storage section that stores management information identifying the file, the management information being related to the file data; a management information retrieval section that retrieves the management information stored in the management information storage section; a control information retrieval section that retrieves control information on a file to be blocked on which a predefined specified processing is to be executed; an execution section that, when the management information retrieved by the management information retrieval section corresponds to the control information retrieved by the control information retrieval section, executes the predefined processing on the file data related to that management information, wherein the management information retrieval section retrieves, when the control information is added in a control information storage section that stores control information, all of the management information stored in the management information storage section, wherein the control information retrieval section retrieves, when the control information is added in the control information storage section, the added control information, and the execution section sequentially compares between the management information retrieved by the management information retrieval section and the control information retrieved by the control information retrieval section.

A computer readable recording medium of the embodiment includes a computer readable recording medium having a file management program recorded thereon that makes a computer comprising a file data storage section that stores file data of a file, to execute a function to manage the file, the file management program making the computer to function as: a management information retrieval section that retrieves management information for identifying the file from a management information section; a control information retrieval section that retrieves control information on a file to be blocked on which a predefined specified processing is to be executed; an execution section that, when the management information retrieved by the management information retrieval section corresponds to the control information retrieved by the control information retrieval section, executes the predefined processing on the file data related to that management information, wherein the management information retrieval section retrieves, when the control information is added in a control information storage section that stores control information, all of the management information stored in the management information storage section, the execution section sequentially compares between the management information retrieved by the management information retrieval section and the control information retrieved by the control information retrieval section.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 7 is a diagram illustrating specified Processing Attribute information of control information used in the file management system as one embodiment;

FIG. 8 is a diagram illustrating comparison Processing Attribute information of control information used in the file management system as one embodiment;

FIG. 9 is a diagram illustrating valid period attribute information of control information used in the file management system as one embodiment;

FIG. 10 is a diagram illustrating an example of the priority of comparison processing between control summary information and management summary information in the file management system as one embodiment;

FIG. 15 is a diagram illustrating a specified Processing Attribute of control information used in the file management system as a variant of one embodiment;

FIG. 17 is a diagram schematically illustrating an example of the structures of management summary information and control summary information used in the file management system according to a variant of one embodiment.

DESCRIPTION OF EMBODIMENTS

Hereinafter, embodiments will be described with reference to the drawings.

(1) Description of One Embodiment

Figure 1:
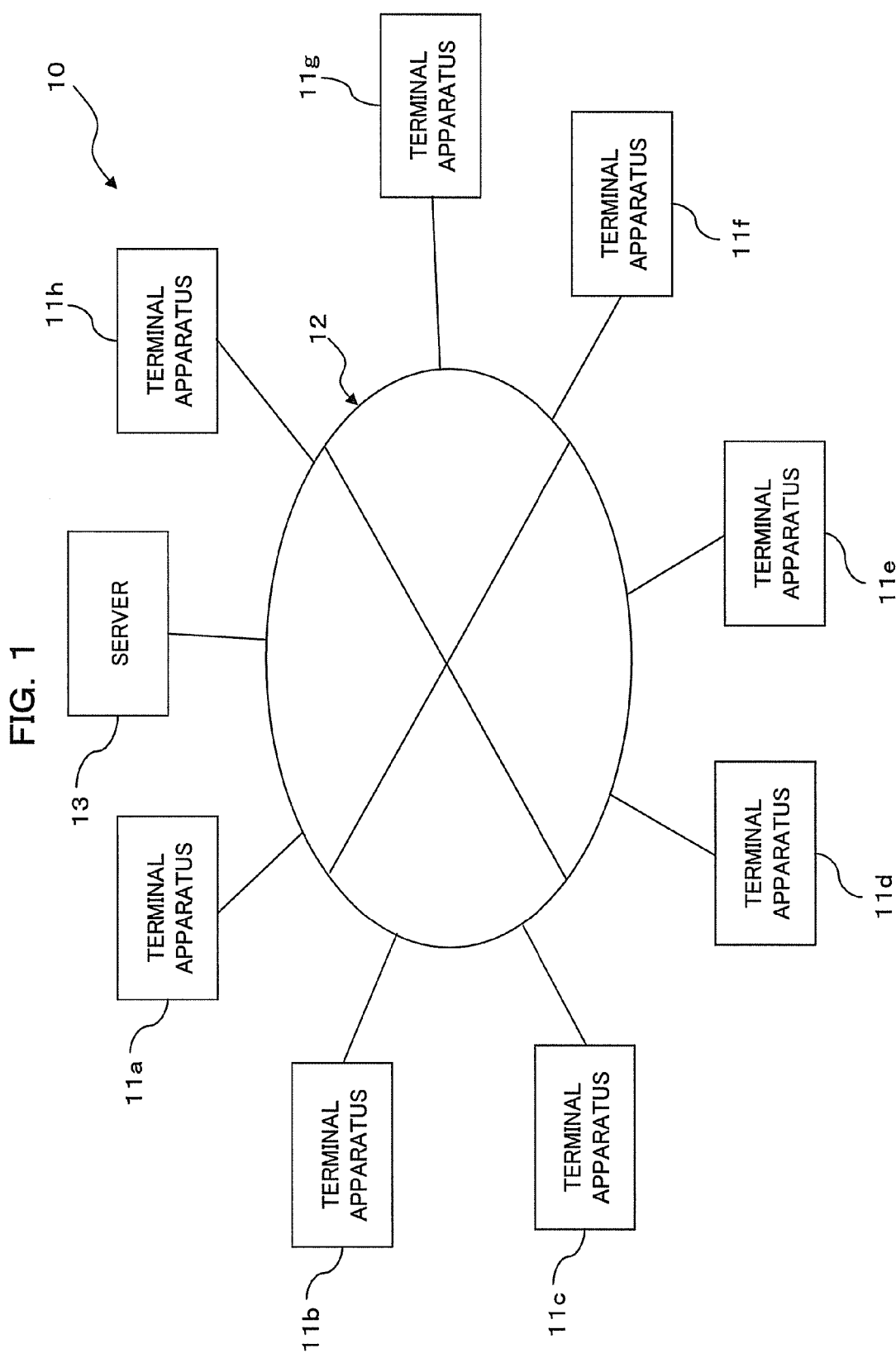
FIG. 1 is a diagram schematically illustrating an example of the configuration of a file management system as one embodiment.
Figure 2:
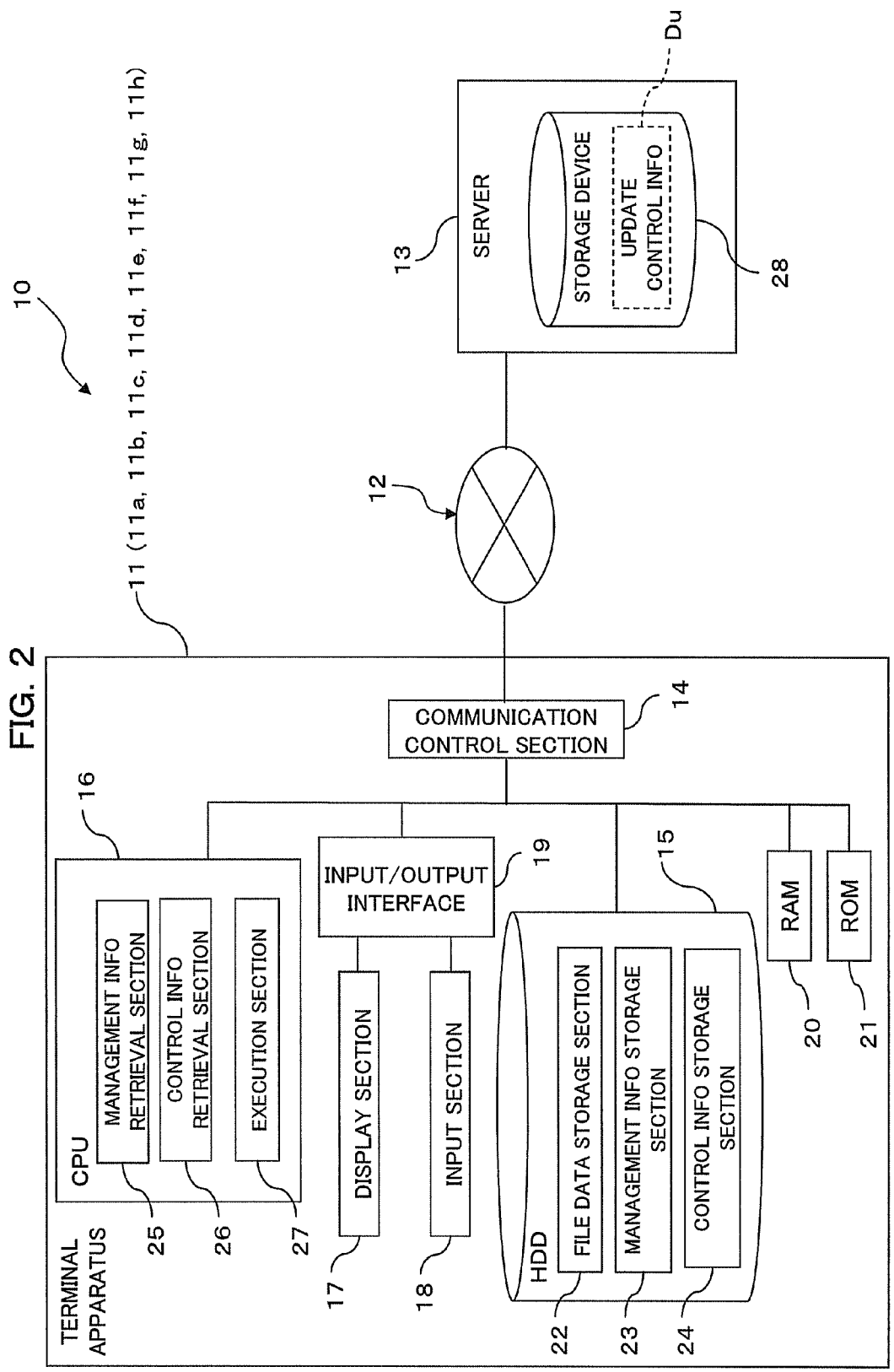
FIG. 2 is a diagram schematically illustrating an example of the configurations of a terminal apparatus and a server in the file management system as one embodiment embodiment.

FIG. 1 is a diagram schematically illustrating an example of the configuration of a file management system as one embodiment, and FIG. 2 is a diagram schematically illustrating an example of the configurations of a terminal apparatus and a server thereof.

As depicted in FIG. 1, a file management system 10 according to this embodiment is configured to include a plurality of (eight in the example depicted in FIG. 1) terminal apparatuses (file management apparatuses) 11a to 11h and a server (block information providing server) 13 that is connected to these plurality of terminal apparatuses 11a to 11h via the Internet (network) 12, and is adapted to manage proliferation (disclosure/leakage) of information relating to important files that is highly confidential, such as personal information, and the distribution of which is to be restricted (blocked) (files to be blocked) over the network, and to prevent proliferation where necessary.

Each of the terminal apparatus 11a to 11h has the similar functions and configuration, and is configured as a computer including a communication control section 14, an HDD (Hard Disk Drive) 15, a CPU (Central Processing Unit) 16, a display section 17, an input section 18, an input/output interface 19, a RAM (Random-Access Memory) 20, and a ROM (Read-Only Memory) 21.

Note that the reference symbols 11a to 11h are used when a reference to a specific one of the terminal apparatuses is required to be made while reference symbol 11 is used when reference is made to any one of the terminal apparatuses.

In the terminal apparatus 11, the CPU 16 is adapted to execute the OS (Operating System) or various programs (file management programs) stored in the HDD 15, thereby implementing various functions. In other words, the HDD 15 stores the OS and these programs.

Only one of the terminal apparatuses 11 connected to the Internet 12 is illustrated in FIG. 2 for the sake of simplicity.

The communication control section 14 is adapted to send and receive various types of information to and from the server 13 or other terminal apparatuses 11 via the Internet 12, and is implemented by well-known various means that can connect the terminal apparatus 11 communicatively to the Internet 12, such as for example, a LAN (Local Area Network) card and the driver for that card.

The HDD 15 is a storage device that stores various programs and data, including the OS (Operating System), and is adapted to function as a file data storage section (actual data storage area) 22, a management information storage section (management data storage area) 23, and a control information storage section 24.

Figure 3:
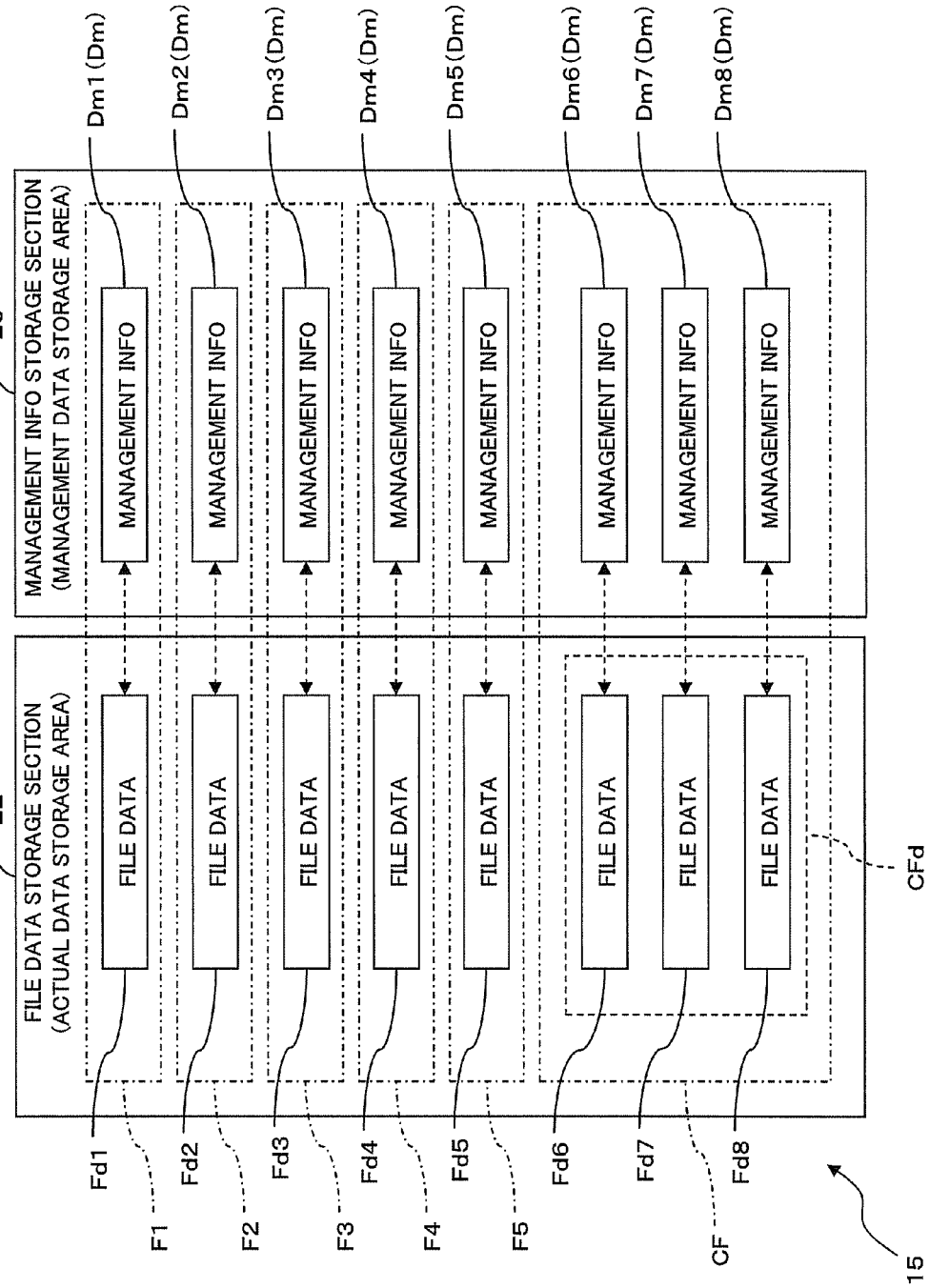
FIG. 3 is a diagram schematically illustrating information stored in a file data storage section and a management information storage section in the file management system as one embodiment.
Figure 4:
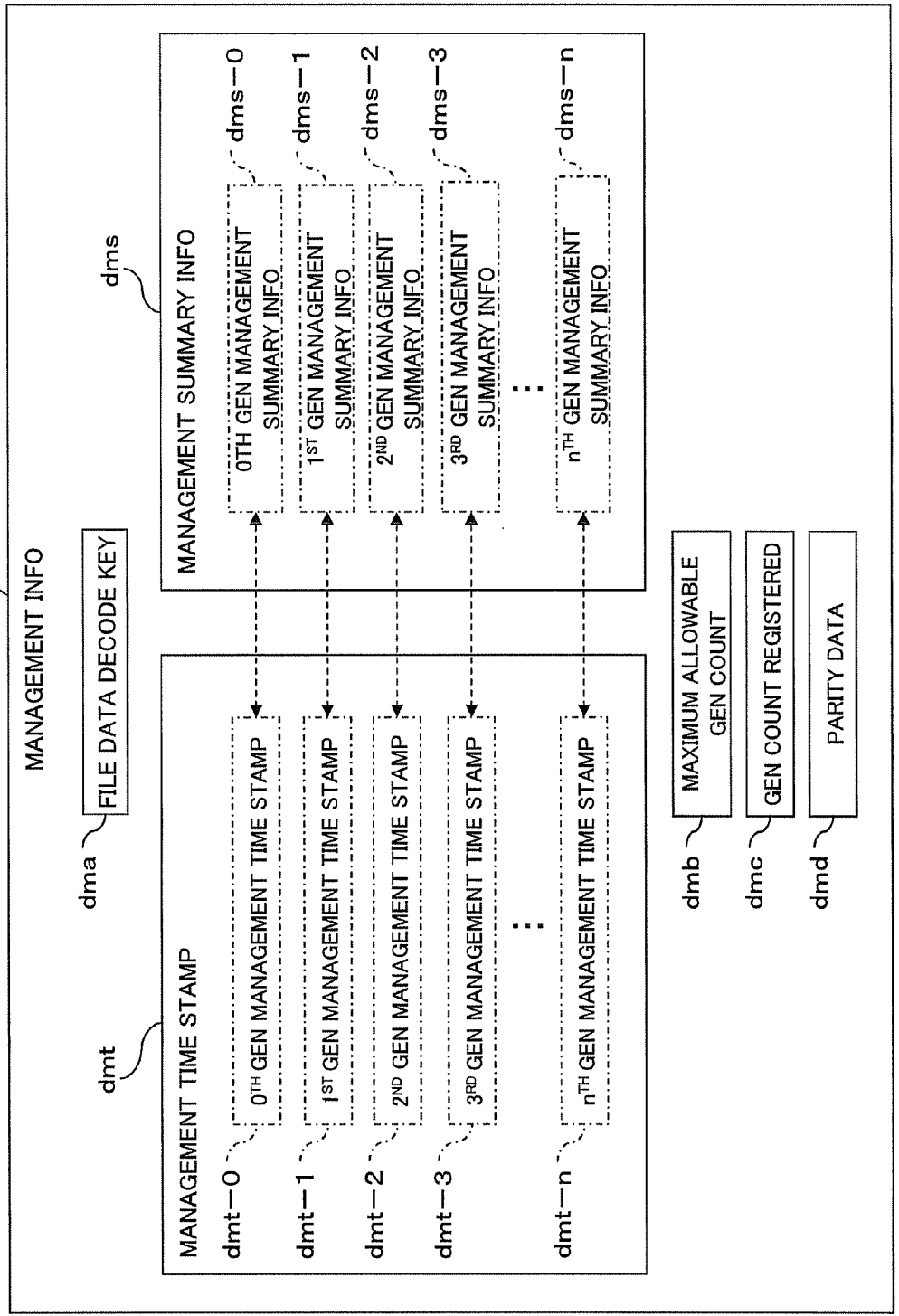
FIG. 4 is a diagram schematically illustrating an example of the structure of management information stored in the management information storage section in the file management system as one embodiment.

FIG. 3 is a diagram schematically illustrating information stored in a file data storage section and a management information storage section in the file management system as one embodiment, and FIG. 4 is a diagram schematically illustrating an example of the structure of management information stored in the management information storage section therein.

The file data storage section 22 is adapted to store file data of files (see the reference symbols F1 to F5 in FIG. 3), and, in the example depicted in FIG. 3, stores eight file data, namely, file data Fd1 to Fd8.

The HDD 15 is also configured to be capable of storing a complex file CF having multiple file data (see FIG. 3), and the file data storage section 22 is adapted to store complex file data CFd for the complex file CF. In the example depicted in FIG. 3, the complex file data CFd has file data Fd6 to Fd8, and the file data storage section 22 stores such complex file data CFd.

Note that the reference symbols Fd1 to Fd8 are used when a reference to a specific one piece of the file data is required to be made while the term "file data" is used instead of using a reference symbol when reference is made to any one piece of the file data.

The file data is a data main body that indicates a descriptive portion (actual data) of the file, and has digital data, such as a document, an image, a movie, an audio. In addition, the file data is stored in the file data storage section 22 while being encrypted, which can prevent the contents of the file data from being retrieved by a direct dump.

Furthermore, well-known various techniques can be used for encrypting the file data. Note that, in this embodiment, each file data is encrypted using the encryption key technique that executes encryption and decode using an encryption key. Detailed descriptions of the encryption key technique will be omitted.

The management information storage section 23 is adapted to store management information Dm while relating it to file data, and in the example depicted in FIG. 3, stores eight pieces of management information Dm, namely, management information Dm1 to Dm8.

Note that, in this embodiment, it is assumed hereinafter that all file data stored in the file data storage section 22 is stored, each file data being related to management information Dm.

Management information Dm1 to Dm8 is management data for unedifying files, each management information related to file data. In the example depicted in FIG. 3, management information Dm1 is related to file data Fd1, management information Dm2 is related to file data Fd2, management information Dm3 is related to file data Fd3, management information Dm4 is related to file data Fd4, management information Dm5 is related to file data Fd5, management information Dm6 is related to file data Fd6, management information Dm7 is related to file data Fd7, and management information Dm8 is related to file data Fd8.

Note that the reference symbols Dm1 to Dm8 are used when a reference to a specific one of the management information is required to be made while reference symbol Dm is used when reference is made to any one of the management information.

The file is configured to include file data and management information Dm related to the file data, and a complex file CF is configured to include a plurality of file data a plurality of pieces of management information Dm each related to each of the file data.

For example, as depicted in FIG. 3, a file F1 is configured to include file data Fd1 and management information Dm1, and a complex file CF is configured to include plurality of file data Fd6 to Fd8 and a plurality of pieces of management information Dm6 to Dm8.

Furthermore, the management information Dm may be stored in the management information storage section 23 attached to the file while being related to file data, as in the resource fork used in the MacOS®, for example, or may be stored in the management information storage section 23 in the form of database.

The management information Dm is configured to include, as depicted in FIG. 4 for example, a file data decode key dma, management summary information dms, a management time stamp dmt, a maximum allowable generation count dmb, a registered generation count dmc, and parity data dmd.

The file data decode key dma is the information related to a decoding key for decoding file data that is related to the management information Dm and is encrypted, and, in this embodiment, is stored in the HDD 15 (management information storage section 23) by computing an XOR (bitwise exclusive OR) of the decoding key and management time stamp dmt that will be described later on a bit-by-bit basis. This can prevent the decoding key from being easily retrieved since the decoding key can be hidden in the HDD 15 (management information storage section 23).

The management summary information dms is a digest (summary; digest byte sequence) of file data stored in the file data storage section 22 prior to encryption of the file data, and is generated using message digest functions (hash functions; summary functions), such as the SHA (Secure Hash Algorithm)-1, MD (Message Digest) 2, MD4, MD5, for example. Note that the management summary information dms is constructed as 160-bit-long binary data, for example.

Furthermore, when file data has been rewritten one or more times from its original data, the management summary information dms is configured to include a plurality of pieces of the management summary information dms which are generated for each generation of the rewritten file data. In the example depicted in FIG. 4, when file data has been updated n times (n is a natural number), the management summary information dms is configured to include the $0^{th}$ generation management summary information dms-0, the $1^{st}$ generation management summary information dms-1, the $2^{nd}$ generation management summary information dms-2, the $3^{rd}$ generation management summary information dms-3, and the $n^{th}$ generation management summary information dms-n.

Note that, hereinafter, when a specific one of a plurality of pieces of management summary information should be referred to, reference symbols dms-0 to dms-n having the reference symbol dms appended by "-(hyphen)" and a number (0-n) indicating the generation of file data are used, whereas reference symbol dms is used when referring to any one of management summary information.

Furthermore, the management summary information dms is generated as digest of the latest file data every time the file data is rewritten (updated), for example, when the file data is saved.

Here, the $0^{th}$ generation management summary information dms-0 indicates a digest of the latest file data of the file, the $1^{st}$ generation management summary information dms-1 indicates a digest of the first previous file data before it was rewritten into the latest file data, and so on. The greater the value (0-n) of the management summary information dms that is indicative of the generation is, the older the digest of rewritten file data becomes. That is, in this embodiment, the management summary information dms that has the greatest value indicative of the generation (the $n^{th}$ generation management summary information dms-n in FIG. 4) indicates the digest of the oldest file data for the file.

The management time stamp dmt is the information that indicates the date and time when the management summary information dms was generated (time stamp).

When there are a plurality of pieces of the management summary information dms, the management time stamps dmt are related to each of the pieces of the management summary information dms. In the example depicted in FIG. 4, for n pieces of management summary information dms, n time stamps, namely, the $0^{th}$ generation management time stamp dmt-0, the $1^{st}$ generation management time stamp dmt-1, the $2^{nd}$ generation management time stamp dmt-2, the $3^{rd}$ generation management time stamp dmt-3, ..., and the $n^{th}$ generation management time stamp dmt-n (n is a natural number) are provided.

In the example depicted in FIG. 4, the $0^{th}$ generation management time stamp dmt-0 is related to the $0^{th}$ generation management summary information dms-0, the $1^{st}$ generation management time stamp dmt-1 is related to the $1^{st}$ generation management summary information dms-1, the $2^{nd}$ generation management time stamp dmt-2 is related to the $2^{nd}$ generation management summary information dms-2, the $3^{rd}$ generation management time stamp dmt-3 is related to the $3^{rd}$ generation management summary information dms-3, ..., and the $n^{th}$ generation management time stamp dmt-n is related to the $n^{th}$ generation management summary information dms-n.

The maximum allowable generation count dmb is information that indicates the limit (upper limit) number of updates of file data. For example, when the maximum allowable generation count dmb indicates "10", ten updates (n==10) is permitted at maximum for file data in the file, indicating that from the $0^{th}$ generation management summary information dms-0 through the $10^{th}$ generation management summary information dms-10 can be generated.

The registered generation count dmc is information that indicates the count n of the generations that are kept as management summary information Dms (n is a natural number). For example, "5" is indicated when the management summary information Dms includes from the $0^{th}$ generation management summary information dms-0 through the $5^{th}$ generation management summary information dms-5.

The parity data dmd is information for inspecting (checking) the integrity of data included in the management information Dm. For example, if the data included in the management information Dm is divided into a plurality of data each having the same bit count (length) as the length of the parity data dmd (parity data length) and the divided data is compared against the parity data dmd by an XOR operation, and an XOR operation is executed on all of the divided data, the integrity check is passes when the result of the entire calculation is 0 (bit 0).

Furthermore, in addition to the file data decode key dma, the management summary information dms, the management time stamp dmt, the maximum allowable generation count dmb, the registered generation count dmc, and the parity data dmd described above, the management information Dm includes various types of information that is required for operating the file management system 10. For the sake of brevity, the illustration thereof will be omitted, as well as its description.

Figure 5:
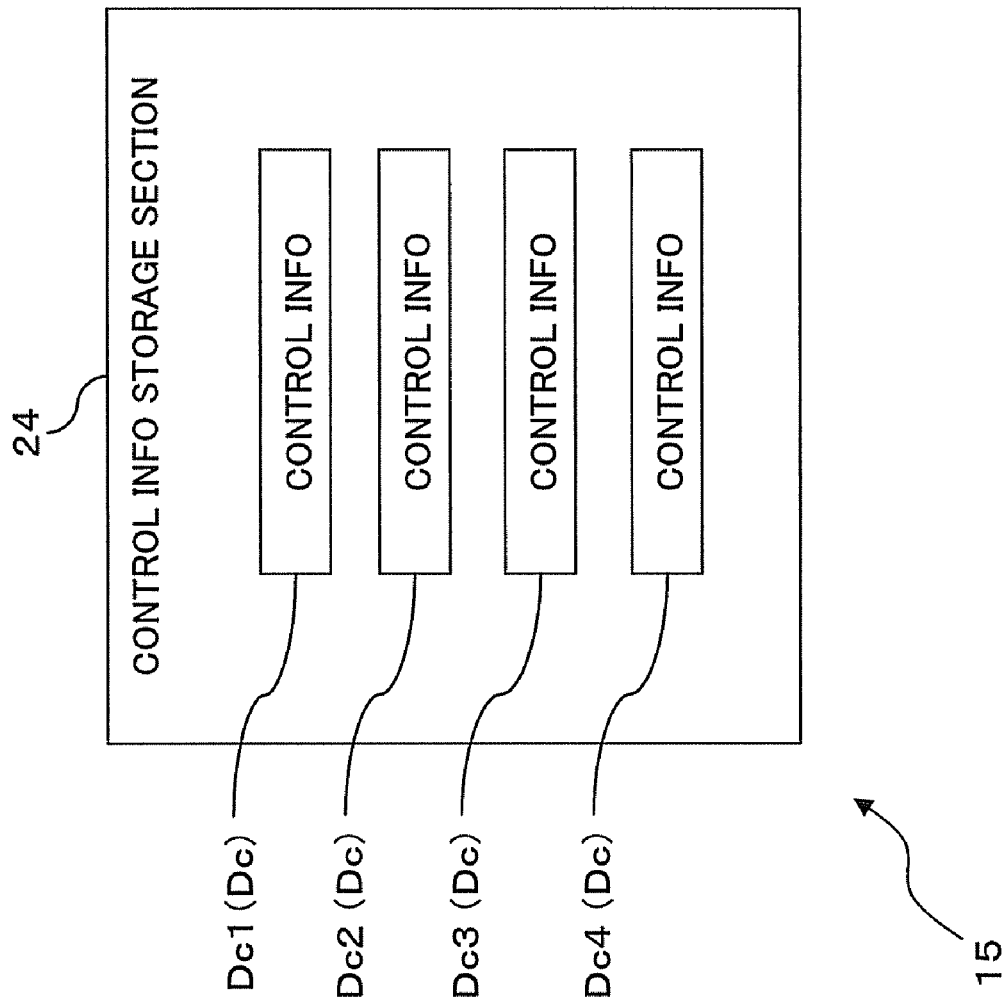
FIG. 5 is a diagram schematically illustrating information stored in the control information storage section in the file management system as one embodiment.
Figure 6:
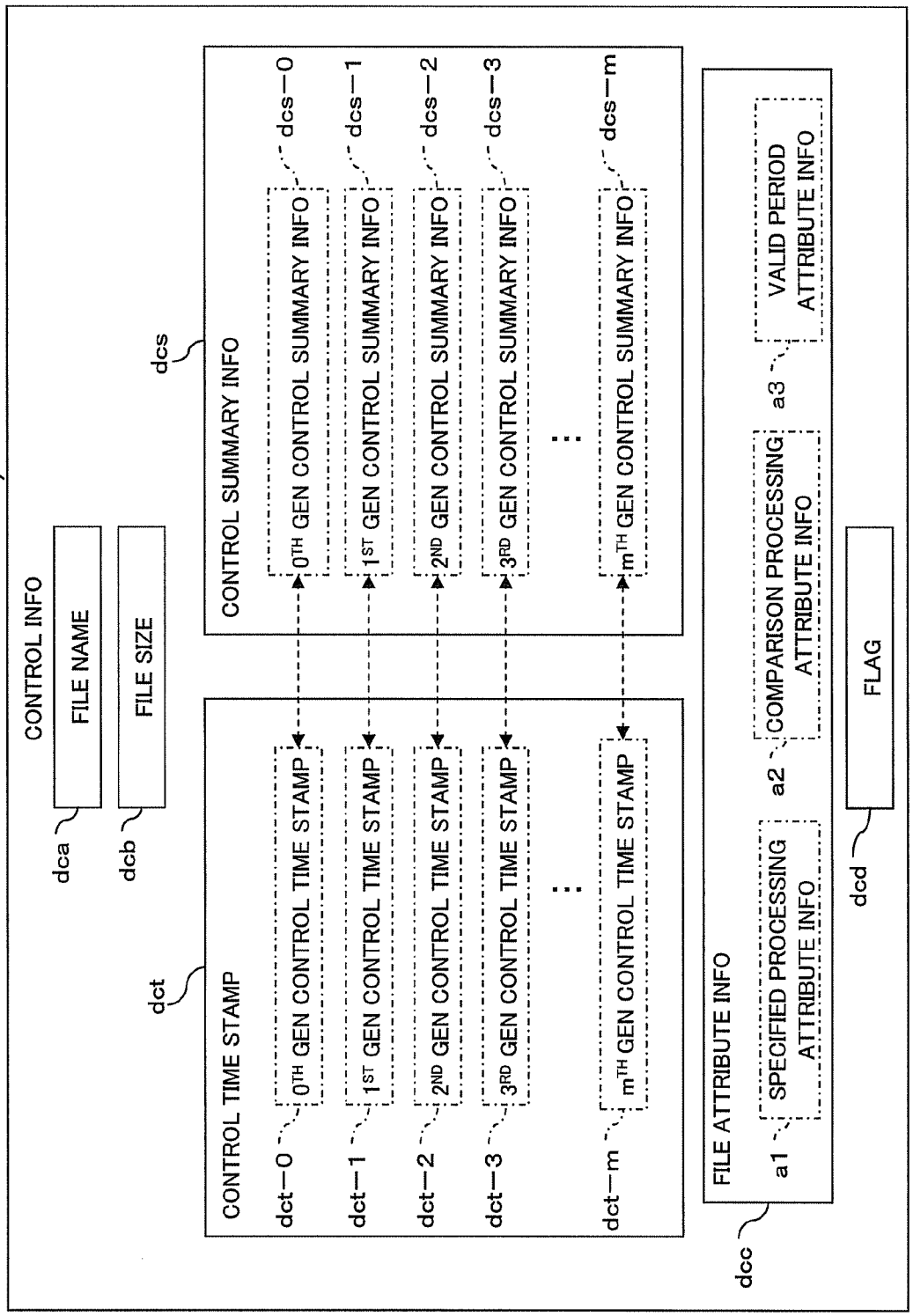
FIG. 6 is a diagram schematically illustrating an example of the structure of control information stored in the control information storage section in the file management system as one embodiment.

FIG. 5 is a diagram schematically illustrating information stored in a control information storage section and a control information storage section in the file management system as one embodiment, and FIG. 6 is a diagram schematically illustrating an example of the structure of control information stored in the control information storage section therein.

The control information storage section 24 is adapted to store (accumulate) control information Dc in a database, and in the example depicted in FIG. 5, four pieces of control information Dc, namely, control information Dc1 to Dc4 is stored in a database (block database).

Note that, a variety of well-known data models can be used for this block database, including the hierarchical data model, the network-type data model, the relational data model, the object data model (object-oriented, object database), the card-type data model.

Note that the reference symbols Dc1 to Dc 4 are used when a reference to specific control information is required to be made while reference symbol Dc is used when reference is made to any one of the control information.

The control information Dc is information related to a file to be blocked. The control information Dc is assigned for each file to be blocked, and is configured to include a file name dca, a file size dcb, control summary information dcs, a control time stamp dct, file attribute information dcc, and a flag dcd, as depicted in FIG. 6. Note that a file to be blocked is a file the distribution of which is to be restricted as set forth previously, and is a file on which a predefined specified processing that will be described later predefined specified processing is to be executed. In addition, control information Dc is generated and registered when a file to be blocked is newly added in the file management system 10.

The file name dca is information that indicates the file name of a file to be blocked, and includes string data of a any given length in this embodiment. Note that, since a file name may be generally modified (renamed) in the course of distribution of the file over the Internet 12, the file name dca is primarily used during maintenance as a reference for checking.

The file size dcb is information that indicates the size (byte count) of the file to be blocked in an integer. Similar to the file name dca described above, the file size dcb is also primarily used during maintenance as a reference for checking.

The control summary information dcs is a digest (summary; digest byte sequence) of file data in the file to be blocked prior to encryption of the file, and is generated using message digest functions (hash functions; summary functions), such as SHA-1, MD2, MD4, MD5, similar to the management summary information dms as set forth previously. Note that the control summary information dcs is generated as 160-bit long binary data, for example, and is used by an execution section 27 that will be described later for identification of the file. Thus, the technique used for generating the control summary information dcs should be the same as the technique used for the management summary information dms.

When file data of a file to be blocked has been rewritten one or more times from its original data, the control summary information dcs is configured to include a plurality of pieces of the control summary information dcs which are generated for each generation of the rewritten file data of the file to be blocked. In the example depicted in FIG. 6, when file data has been updated m times (m is a natural number), the control summary information dcs is configured to include the $0^{th}$ generation control summary information dcs-0, the $1^{st}$ generation control summary information dcs-1, the $2^{nd}$ generation control summary information dcs-2, the $3^{rd}$ generation control summary information dcs-3, and a $m^{th}$ generation control summary information dcs-m.

Note that, hereinafter, when a specific one of a plurality of pieces of control summary information should be referred to, reference symbols dcs-0 to dcs-m having the reference symbol dcs appended by "-(hyphen)" and a number (0-m) indicating the generation of file data are used, whereas reference symbol dcs is used when referring to any one of control summary information.

Furthermore, the control summary information dms is generated as digest of the latest file data of a file to be blocked every time the file data of the file to be blocked is rewritten (updated), for example, when the file data is saved.

Here, the $0^{th}$ generation control summary information dcs-0 indicates a digest of the latest file data of the file, the $1^{st}$ generation control summary information dcs-1 indicates a digest of the first previous file data before it was rewritten into the latest file data, and so on. The greater the value (0-m) of the control summary information dcs that is indicative of the generation is, the older the digest of rewritten file data becomes. That is, in this embodiment, the control summary information dcs that has the greatest value indicative of the generation (the $m^{th}$ generation control summary information dcs-m in FIG. 6) indicates the digest of the oldest file data for the file to be blocked.

The control time stamp dct is the information that indicates the date and time when the control summary information dms was generated (time stamp).

When there are a plurality of pieces of the control summary information dcs, the control time stamps dct are related to each of the pieces of the control summary information dcs. In the example depicted in FIG. 6, for m pieces of control summary information dcs, n time stamps, namely, the $0^{th}$ generation control time stamp dct-0, the $1^{st}$ generation control time stamp dct-1, the $2^{nd}$ generation control time stamp dct-2, the $3^{rd}$ generation control time stamp dct-3, . . . , and the $m^{th}$ generation control time stamp dct-m (m is a natural number) are provided.

In the example depicted in FIG. 6, the $0^{th}$ generation control time stamp dct-0 is related to the $0^{th}$ generation control summary information dcs-0, the $1^{st}$ generation control time stamp dct-1 is related to the $1^{st}$ generation control summary information dcs-1, the $2^{nd}$ generation control time stamp dct-2 is related to the $2^{nd}$ generation control summary information dcs-2, the $3^{rd}$ generation control time stamp dct-3 is related to the $3^{rd}$ generation control summary information dcs-3, . . . , and the $m^{th}$ generation control time stamp dct-n is related to the $n^{th}$ generation control summary information dcs-m.

The file attribute information dcc is information that indicates the attribute of file to be blocked and is used when operating the file management system 10. For example, as depicted in FIG. 6, the file attribute information dcc is configured to include specified processing attribute information a1, comparison processing attribute information a2, and valid period attribute information a3.

FIG. 7 is a diagram illustrating specified attribute information of control information used in the file management system as one embodiment, and indicates specified definition information b1 defining specified attribute information a1.

The specified processing attribute information a1 is information on processing (specified processing) to be executed on a file corresponding to a file to be blocked (hereinafter, referred to as "that file") when the execution section 27 that will be described later finds that file.

In this embodiment, one of specified processing among three specified processings, namely, "DELETION", "READ-DISABLING" and "REPORT" is executed, and the information for identifying one of specified processings is set as specified processing attribute information a1.

Here, "DELETION" indicates deletion processing that deletes the file data from the file data storage section 22, "READ-DISABLING" indicates read-disabling processing that changes the attribute of the file data to "read-disabled", and "REPORT" indicates report processing that reports by sending an electronic mail to a predetermined address, for example.

The specified processing attribute information a1 is predetermined by the specified processing definition information b1, as depicted in FIG. 7, for example.

The specified processing definition information b1 defines the specified processing name and the description of the processing for each of a plurality of specified processings (see the columns "SPECIFIED PROCESSING NAME" and "DESCRIPTION OF SPECIFIED PROCESSING" in FIG. 7) by relating them to a number corresponding to the specified processing (see the column "NUMBER" in FIG. 7) as depicted in FIG. 7, and further defines additional information related to that specified processing where necessary (see the column "Options" in FIG. 7).

In the specified processing definition information b1 in the example depicted in FIG. 7, Number "1" is defined by being related to the specified processing name of "DELETION". Similarly, Number "2" is defined by being related to the specified processing name of "READ-DISABLING", and the attribute after being changed (attribute after change) is defiled as additional information. Similarly, Number "3" is defined by being related to the specified processing name of "REPORT", and the mail address to which a report is to be sent is defiled as additional information.

One of Number "1", "2" and "3" described above is selected and set to specified processing attribute information a1, for example, and additional information corresponding to the selected number is assigned.

Note that, in this embodiment, the specified processing name "DELETION" is used as a normal specified processing, and the specified processing name "READ-DISABLING" or "REPORT" is used for the specified processing depending on the importance of a file to be blocked.

FIG. 8 is a diagram illustrating comparison Processing Attribute information of control information used in the file management system as one embodiment, and indicates comparison processing definition information b2 defining comparison processing attribute information a2.

The comparison processing attribute information a2 is the information for identifying which generation of management summary information dms and which generation of control summary information dcs that are to be compared against each other when executing comparison processing between management summary information dms and control summary information dcs.

In this embodiment, one of four types of comparison processing, namely, "LATEST MATCH", "LATEST MATCH"+"INHERITED MATCH", "LATEST MATCH"+"INHERITED MATCH"+"PAST MATCH", and "LATEST MATCH"+"INHERITED MATCH"+"PAST MATCH"+"COMMON ANCESTOR MATCH". The information for identifying one of the comparison processing is set as the comparison processing attribute information a2.

Here, the "LATEST MATCH" indicates comparing between the $0^{th}$ generation management summary information and the $0^{th}$ generation control summary information, and "INHERITED MATCH" indicates comparing between one of $1^{st}$ to $n^{th}$ generation management summary information and the $0^{th}$ generation control summary information. In addition, "PAST MATCH" indicates comparing between the $0^{th}$ generation management summary information and one of $1^{st}$ to $m^{th}$ generation control summary information, and "COMMON ANCESTOR MATCH" indicates comparing between one of $1^{st}$ to $n^{th}$ generation management summary information and one of $1^{st}$ to $m^{th}$ generation control summary information.

Furthermore, "LATEST MATCH"+"INHERITED MATCH" indicates executing comparison processings of "LATEST MATCH" and "INHERITED MATCH", "LATEST MATCH"+"INHERITED MATCH"+"PAST MATCH" indicates executing comparison processings of "LATEST MATCH", "INHERITED MATCH", and "PAST MATCH", and "LATEST MATCH"+"INHERITED MATCH"+"PAST MATCH"+"COMMON ANCESTOR MATCH" indicates executing comparison processings of "LATEST MATCH", "INHERITED MATCH", "PAST MATCH", and "COMMON ANCESTOR MATCH".

Furthermore, the comparison processing attribute information a2 is predetermined by the comparison processing definition information b2, as depicted in FIG. 8, for example.

The comparison processing definition information b2 defines the comparison processing name and the description of the processing for each of a plurality of comparison processings (see the columns "comparison processing name" and "description of comparison PROCESSING" in FIG. 8) by relating them to a number corresponding to the comparison processing (see the column "NUMBER" in FIG. 8) as depicted in FIG. 8.

Note that additional information related to the plurality of comparison processings may be defined where necessary (see the column "Options" in FIG. 8).

In the comparison processing definition information b2 in the example depicted in FIG. 8, Number "1" is related to the comparison processing name "LATEST MATCH", Number "2" is related to the comparison processing name "LATEST MATCH"+"INHERITED MATCH", Number "3" is related to the comparison processing name "LATEST MATCH"+"INHERITED MATCH"+"PAST MATCH", and Number "4" is related to the comparison processing name "LATEST MATCH"+"INHERITED MATCH"+"PAST MATCH"+"COMMON ANCESTOR MATCH".

One of Number "1", "2", "3" and "4" described above is selected and set to comparison processing attribute information a2, for example.

FIG. 9 is a diagram illustrating valid period attribute information of control information used in the file management system as one embodiment, and indicates valid period definition information b3 defining valid period attribute information a3.

The valid period attribute information a3 is information that indicates the valid period or the valid count of control information Dc stored in the control information storage section 24 as valid limit information.

In this embodiment, one valid limit information of four types of valid limit information, namely, "NO SETTING", "DUE DATE", "DURATION" and "COUNT" is set as the valid period attribute information a3.

Here, "NO SETTING" indicates that no valid period or valid count is set, and "DUE DATE" indicates that the information is valid until the due date (for example, date) that is separately set. In addition, "DURATION" indicates that the information is valid during a duration (for example, day counts) that is separately set, and "COUNT setting" indicates that the information is valid until a count (for example, a usage count or access count) that is separately set is reached.

Furthermore, the valid period attribute information a3 is predetermined by the valid period definition information b3, as depicted in FIG. 9, for example.

The valid period definition information b3 defines the valid restriction information and the description of the restriction for each of a plurality of pieces of valid restriction information (see the columns "valid restriction information" and "description of the restriction of valid period" in FIG. 9) by relating them to a number corresponding to the valid restriction information (see the column "NUMBER" in FIG. 9) as depicted in FIG. 9, and further defines additional information related to that valid restriction information where necessary (see the column "Options" in FIG. 9).

In the valid period definition information b3 in the example depicted in FIG. 9, Number "1" is defined by being related to the valid restriction information of "NO SETTING". Similarly, Number "2" is defined by being related to the valid restriction information of "DUE DATE", and the due date to be set is defiled as additional information. Similarly, Number "3" is defined by being related to the valid restriction information of "DURATION", and the duration to be set is defiled as additional information. Similarly, Number "4" is defined by being related to the valid restriction information of "COUNT", and the count to be set is defined as additional information.

One of Number "1", "2", "3" and "4" described above is selected and set to valid period attribute information a3, for example, and additional information corresponding to the selected number is assigned. This can accommodate cases in which it is suffice to execute the specified processing during a certain duration or up to a certain count.

Note that, in this embodiment, control information Dc that exceeds the valid period or valid count that has been set may be invalidated by a flag dcd that will be described later and may be deleted from the control information storage section 24. In addition, deletion from the control information storage section 24 can prevent disadvantages in terms of resources, such as available storage capacity in the control information storage section 24.

The specified processing attribute information a1, the comparison processing attribute information a2, and the valid period attribute information a3 may be set arbitrally by the user who made a file to be blocked.

In addition to the specified processing attribute information a1, the comparison processing attribute information a2, and the valid period attribute information a3, the file attribute information dcc includes attribute information that is widely used in the UNIX® or other OSs. For the sake of brevity, the illustration thereof will be omitted, as well as its description.

The flag dcd is information (a flag) that indicates whether the control information Dc is currently enabled or disabled. For example, setting the flag dcd to "1" indicates that the control information Dc is enabled if the restriction of the valid limit information that is set in the valid period attribute information a3 is not exceeded, and setting the flag dcd to "0" indicates that it is disabled if the restriction of the valid limit information that is set in the valid period attribute information a3 is exceeded. Note that no processing that will be described later is executed on the control information Dc that is disabled by the flag dcd.

The CPU 16 is configured to perform various types of mathematical calculations, information processing, and apparatus controls, and is adapted to function as a management information retrieval section 25, a control information retrieval section 26 and the execution section 27 in this embodiment.

The management information retrieval section 25 is adapted to retrieve the management information Dm stored in the management information storage section 23 when an updating event occurs in the file management system 10.

In this embodiment, when an updating event occurs in response to the control information Dc being added in the control information storage section 24, the management information retrieval section 25 is adapted to retrieve all management information Dm stored in the management information storage section 23. In addition, when an updating event occurs in response to file data stored in the file data storage section 22 being rewritten or file data being added in the file data storage section 22, the management information retrieval section 25 is adapted to retrieve management information Dm related to the rewritten or added file data.

Thus, the management information retrieval section 25 constantly monitors occurrence of updating events in the file management system 10, and retrieves management information Dm when an updating event occurs.

The control information retrieval section 26 is adapted to retrieve the control information Dc stored in the control information storage section 24 when an updating event occurs in the file management system 10 as described previously.

In this embodiment, when an updating event occurs in response to the control information Dc being added in the control information storage section 24 as described previously, the control information retrieval section 26 is adapted to retrieve the control information Dc that are added. In addition, when an updating event occurs in response to file data stored in the file data storage section 22 being rewritten or file data being added in the file data storage section 22, the control information retrieval section 26 is adapted to retrieve all control information Dc stored in the control information storage section 24.

Thus, the control information retrieval section 26 constantly monitors occurrence of updating events in the file management system 10, and retrieves control information Dc when an updating event occurs.

The execution section 27 is adapted to, when the management information Dm retrieved by the management information retrieval section 25 corresponds to the control information Dc retrieved by the control information retrieval section 26, execute specified processing on file data related to the management information Dm corresponding to the control information Dc. In this embodiment, the execution section 27 is adapted to inspect (check) whether or not file data related to the management information Dm retrieved by the management information retrieval section 25 is information on a file to be blocked.

More specifically, the execution section 27 is adapted to, for example, sequentially compare between the management summary information dms retrieved by the management information retrieval section 25 and the control summary information dcs retrieved by the control information retrieval section 26, and to inspect whether or not the management summary information dms retrieved by the management information retrieval section 25 matches or substantially matches to the control summary information dcs retrieved by the control information retrieval section 26.

For example, when an updating event occurs in response to control information Dc being added in the control information storage section 24, the execution section 27 sequentially compares between each management summary information dms included in each of all management information Dm stored in the management information storage section 23 and control summary information dcs contained in the added control information Dc. In addition, when an updating event occurs in response to file data stored in the file data storage section 22 being rewritten or file data being added in the file data storage section 22, the execution section 27 sequentially compares management summary information dms included in the management information Dm related to the rewritten or added file data and each control summary information dcs included in each of all control information Dc stored in the control information storage section 24.

Furthermore, the comparison between control summary information dcs and management summary information dms is performed on the basis of comparison processing attribute information a2 contained in file attribute information dcc in the control information Dc related to the control summary information dcs.

Furthermore, when comparing between the control summary information dcs and the management summary information dms, comparison processing is performed on the basis of a preset priority.

FIG. 10 is a diagram illustrating an example of the priority of comparison processing between control summary information and management summary information in the file management system as one embodiment.

When executing comparison processing between control summary information dcs and management summary information dms, for example, the number in the comparison processing attribute information a2 included in the file attribute information dcc in the control information Dc indicates "4" (that is, when the comparison processing is "LATEST MATCH"+"INHERITED MATCH"+"PAST MATCH"+"COMMON ANCESTOR MATCH"), firstly, the execution section 27 compares between the $0^{th}$ generation control summary information dcs-0 and the $0^{th}$ generation management summary information dms-0, as depicted in FIG. 10 (see the comparison order "1" in FIG. 10).

Next, the execution section 27 sequentially compares between the $0^{th}$ generation control summary information dcs-0 and each of $1^{st}$ generation or later management summary information dms (the $1^{st}$ generation management summary information dms through the $1^{st}$ to $n^{th}$ generation management summary information dms-n) (see the comparison order "2" in FIG. 10). Thereafter, the execution section 27 sequentially compares between each of $1^{st}$ generation or later control summary information dcs (the $1^{st}$ generation control summary information dcs through the $1^{st}$ to $m^{th}$ generation control summary information dcs-m) and the $0^{th}$ generation management summary information dins-0 (see the comparison order "3" in FIG. 10).

Finally, the execution section 27 sequentially compares between each of $1^{st}$ generation or later control summary information dcs and each of $1^{st}$ generation or later management summary information dms (see the comparison order "4" in FIG. 10).

When one of the $0^{th}$ generation management summary information dms-0 through the $n^{th}$ generation management summary information dms-n matches or substantially matches (hereinafter, simply refereed to as "matches") to one of the $0^{th}$ generation control summary information dcs-0 through the $m^{th}$ generation control summary information dcs-m, the execution section 27 is adapted to execute, as specified processing, one of "DELETION PROCESSING", "READ-DISABLING PROCESSING" and "REPORT PROCESSING" on file data related to the matched management summary information dms on the basis of the specified Processing Attribute a1 included in the control information Dc related to the matched control summary information.

That is, when the number in the specified processing attribute information a1 included in the file attribute information dcc in the control information Dc related to the matched control summary information dcs indicates "1", the execution section 27 executes "DELETION PROCESSING" on the file data related to the matched management summary information dms. In addition, when the number in the specified processing attribute information a1 included in the file attribute information dcc in the control information Dc related to the matched control summary information dcs indicates "2", the execution section 27 executes "READ-DISABLING PROCESSING" on the file data related to the matched management summary information dms. Furthermore, when the number in the specified processing attribute information a1 included in the file attribute information dcc in the control information Dc related to the matched control summary information dcs indicates "3", the execution section 27 executes "REPORT PROCESSING" on the file data related to the matched management summary information dms.

Note that, if complex file data CFd (see FIG. 3) having multiple file data (see reference symbols Fd6, Fd7, and Fd8 in FIG. 3) is stored in the file data storage section 22, the execution section 27 is adapted to execute the specified processing on the entire complex file data CFd including the file data related to the matched management information Dm.

The display section 17 is adapted to display various types of information on the terminal apparatus 11. The input section 18 is adapted to provide data or directions to a terminal apparatus in response to various inputs or operations made by the user or the like, and is configured to include a mouse or a keyboard, for example.

The input/output interface 19 is for controlling input/output devices, such as the display section 17 or the input section 18.

The RAM 20 is for temporarily decompressing and storing data or programs when the CPU 16 is executing various types of processing, and the ROM 21 is adapted to store programs or various types of data that are being executed and/or processed by the CPU 16.

The server 13 is adapted to manage the terminal apparatus 11 via the Internet 12, and is configured to include a storage device 28, for example. Note that the storage device 28 may be connected to the outside of the server 13.

The storage device 28 is an apparatus that store various types of information, and stores update control information Du referenced by a plurality of terminal apparatuses 11a to 11h upon updating control information Dc stored in each of the plurality of terminal apparatuses 11a to 11h, for example. Note that such update control information Du has information similar to that of control information Dc, and the user resisters update control information Du.

When control information Dc is updated in, for example, the terminal apparatus 11, the server 13 retrieves the updated control information Dc and reflects it to update control information Du.

Furthermore, the terminal apparatus 11 periodically retrieve update control information Du from the server 13 via the Internet 12, and reflect it to control information Dc. This ensures that control information Dc is periodically updated.

Figure 11:
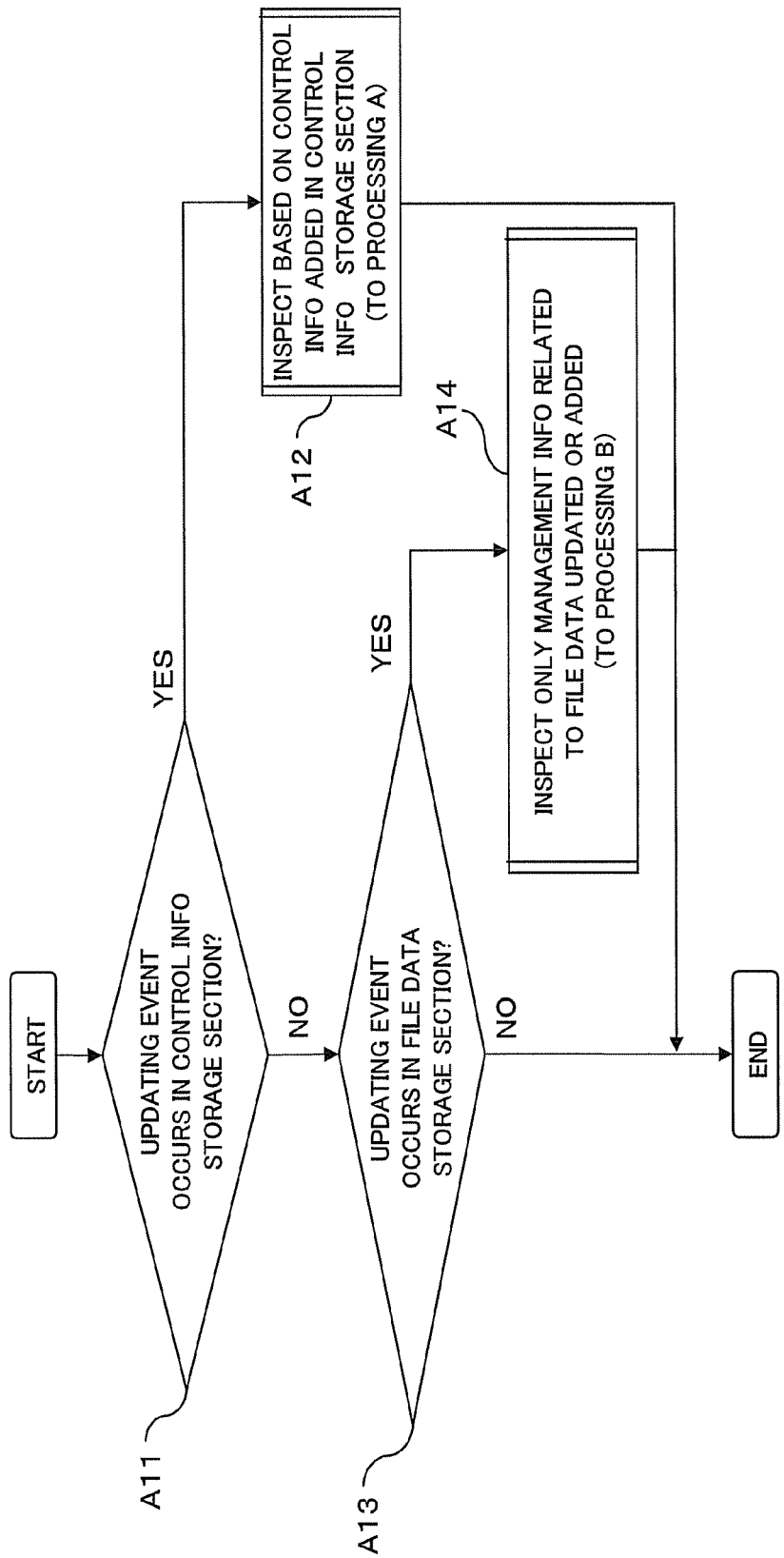
FIG. 11 is a flowchart illustrating the procedure for executing specified processing in the file management system according to one embodiment.

The procedure for executing a specified processing in the file management system according to one embodiment which is configured as set forth previously will be described with reference to the flowchart depicted in FIG. 11 (Steps A11-A14).

The management information retrieval section 25 and the control information retrieval section 26 checks whether or not an updating event occurs in the control information storage section 24 (Step A11).

For example, when an updating event occurs in the control information storage section 24 in response to control information Dc being added in the control information storage section 24 (see the "YES" route in Step A11), all management information Dm stored in the management information storage section 23 is inspected on the basis of the control information Dc added in the control information storage section 24 (Step A12). Note that the particular inspection procedure (Processing A) when an updating event occurs in the control information storage section 24 will be described later (see FIG. 12).

On the other hand, when no updating event occurs in the control information storage section 24 (see the "NO" route in Step A11), the management information retrieval section 25 and the control information retrieval section 26 checks whether or not an updating event occurs in the file data storage section 22 (Step A13).

For example, when an updating event occurs in the file data storage section 22 in response to file data stored in the file data storage section being rewritten or file data being added in the file data storage section 22 (see the "YES" route in Step A13), on the basis of all control information Dc stored in the control information storage section 24, the management information Dm related to the rewritten or added file data is inspected (Step A14). Note that the particular inspection procedure (Processing B) when an updating event occurs in the file data storage section 22 will be described later (see FIG. 13).

On the other hand, when no updating event occurs in the file data storage section 22 (see the "NO" route in Step A13), the processing is terminated.

Thus, the management information retrieval section 25 and the control information retrieval section 26 are adapted to constantly monitor occurrence of an updating event in the file management system 10 by repeating the processing of Steps A11-A14 described above.

Figure 12:
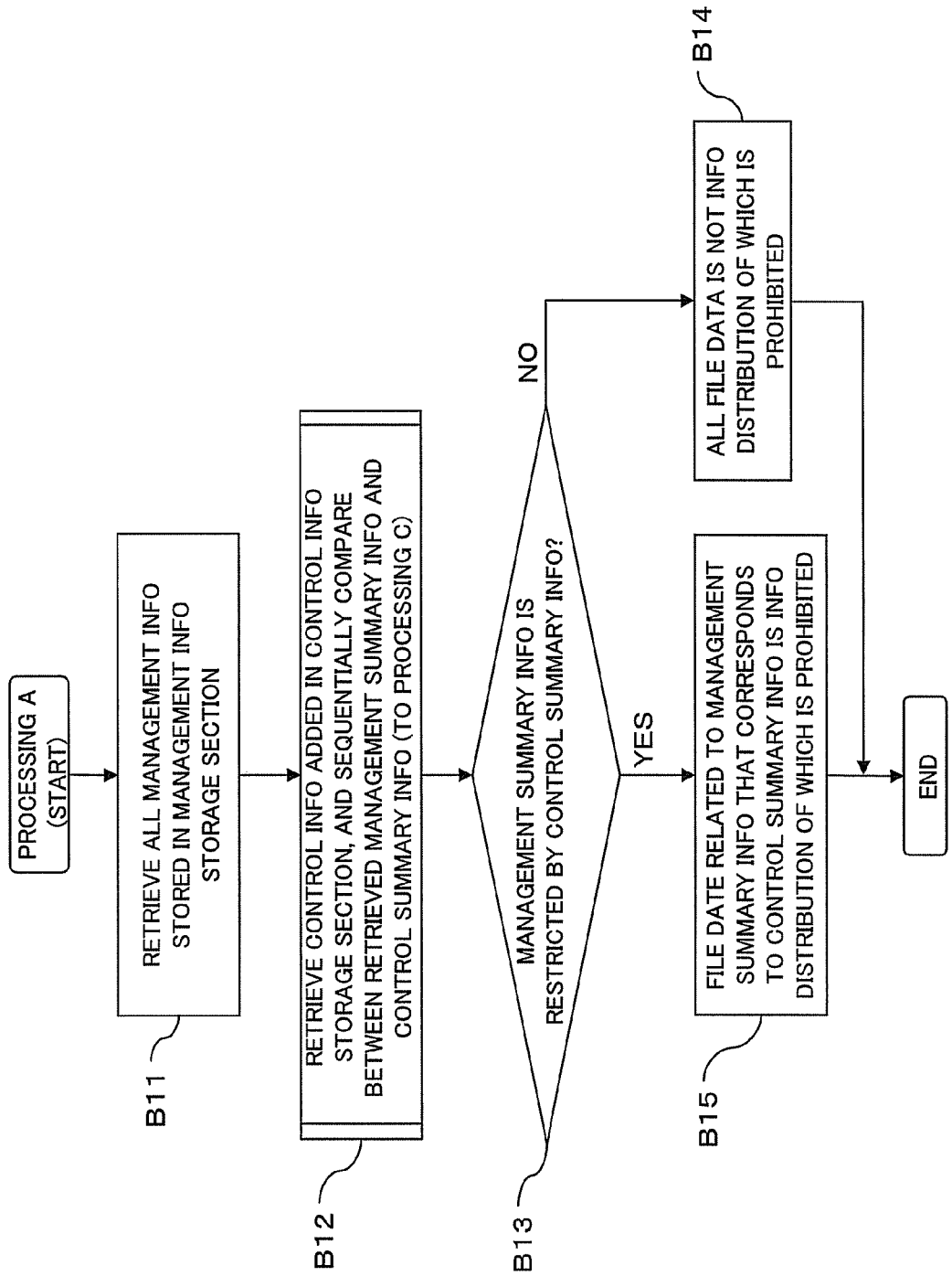
FIG. 12 is a flowchart illustrating an example of the particular inspection procedure when an updating event occurs in the control information storage section in the file management system according to one embodiment.

Next, an example of the particular inspection procedure (Processing A) when an updating event occurs in the control information storage section in the file management system according to one embodiment which is configured as set forth previously will be described with reference to the flowchart depicted in FIG. 12 (Steps B11-B15).

When an updating event occurs in the control information storage section 24, the management information retrieval section 25 retrieves all management information Dm stored in the management information storage section 23 (Step B11).

The control information retrieval section 26 retrieves the control information Dc added in the control information storage section 24. The execution section 27 sequentially compares between the management summary information dms retrieved by the management information retrieval section 25 and the control summary information dcs retrieved by the control information retrieval section 26 on the basis of the comparison processing attribute information a2 included in the file attribute information dcc in the control information Dc retrieved by the control information retrieval section 26, and determines whether not there is a match between management summary information dms and control summary information dcs, that is, whether or not the management summary information dms is restricted by the control summary information dcs (Step B12). Note that the procedure for comparing between the management summary information dms and the control summary information dcs (Processing C) will be described later (see FIG. 14).

When there is no management summary information dms that matches to the control summary information dcs retrieved by the control information retrieval section 26, that is, management summary information dms is not restricted by the control summary information dcs (see the "NO" route in Step B13), the execution section 27 determines that all file data stored in the file data storage section 22 is not information on a file to be blocked (Step B14) and the processing is terminated.

On the other hand, when management summary information dms that matches to the control summary information dcs retrieved by the control information retrieval section 26 is found, that is, management summary information dms is restricted by the control summary information dcs (see the "YES" route in Step B13), the execution section 27 determines that file data related to the management summary information dms that matches to the control summary information dcs is information on a file to be blocked, executes a specified processing on the basis of the specified processing attribute information a1 contained in the file attribute information dcc in the matching control information Dc (Step B15), and the processing is terminated.

Figure 13:
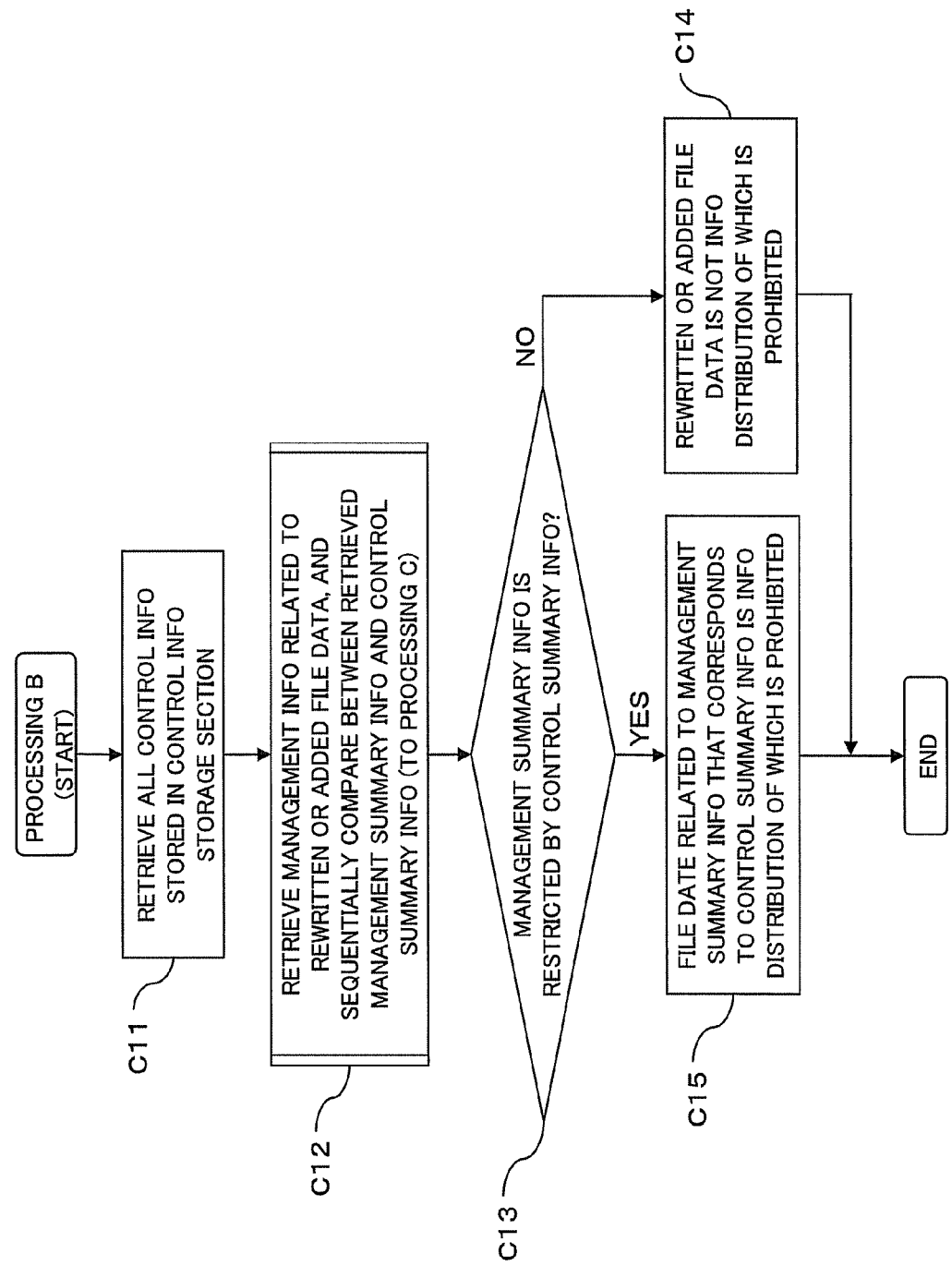
FIG. 13 is a flowchart illustrating an example of the particular inspection procedure when an updating event occurs in a file data storage section in the file management system according to one embodiment.

Next, an example of the particular processing procedure (Processing B) when an updating event occurs in the file data storage section in the file management system according to one embodiment which is configured as set forth previously will be described with reference to the flowchart depicted in FIG. 13 (Steps C11-C15).

When an updating event occurs in the file data storage section 22, the control information retrieval section 26 retrieve all control information Dc stored in the control information storage section 24 (step C11).

The control information retrieval section 25 retrieves management information Dm related to the rewritten or added file data. The execution section 27 sequentially compares between the management summary information dms retrieved by the management information retrieval section 25 and the control summary information dcs retrieved by the control information retrieval section 26 on the basis of the comparison processing attribute information a2 included in the file attribute information dcc in the control information Dc retrieved by the control information retrieval section 26, and determines whether or not there is a match between management summary information dms and control summary information dcs, that is, whether or not the management summary information dms is restricted by the control summary information dcs (Step C12). Note that the procedure for comparing between the management summary information dms and the control summary information dcs (Processing C) will be described later (see FIG. 14).

When there is no management summary information dms that matches to the control summary information dcs retrieved by the control information retrieval section 26, that is, management summary information dms is not restricted by the control summary information dcs (see the "NO" route in Step C13), the execution section 27 determines that the rewritten or added file data is not information on a file to be blocked (Step C14) and the processing is terminated.

On the other hand, when management summary information dms that matches to the control summary information dcs retrieved by the control information retrieval section 26 is found, that is, management summary information dms is restricted by the control summary information dcs (see the "YES" route in Step C13), the execution section 27 determines that file data related to the management summary information dms that matches to the control summary information dcs is information on a file to be blocked, executes a specified processing on the basis of the specified processing attribute information a1 contained in the file attribute information dcc in the matching control information Dc (Step C15), and the processing is terminated.

Figure 14:
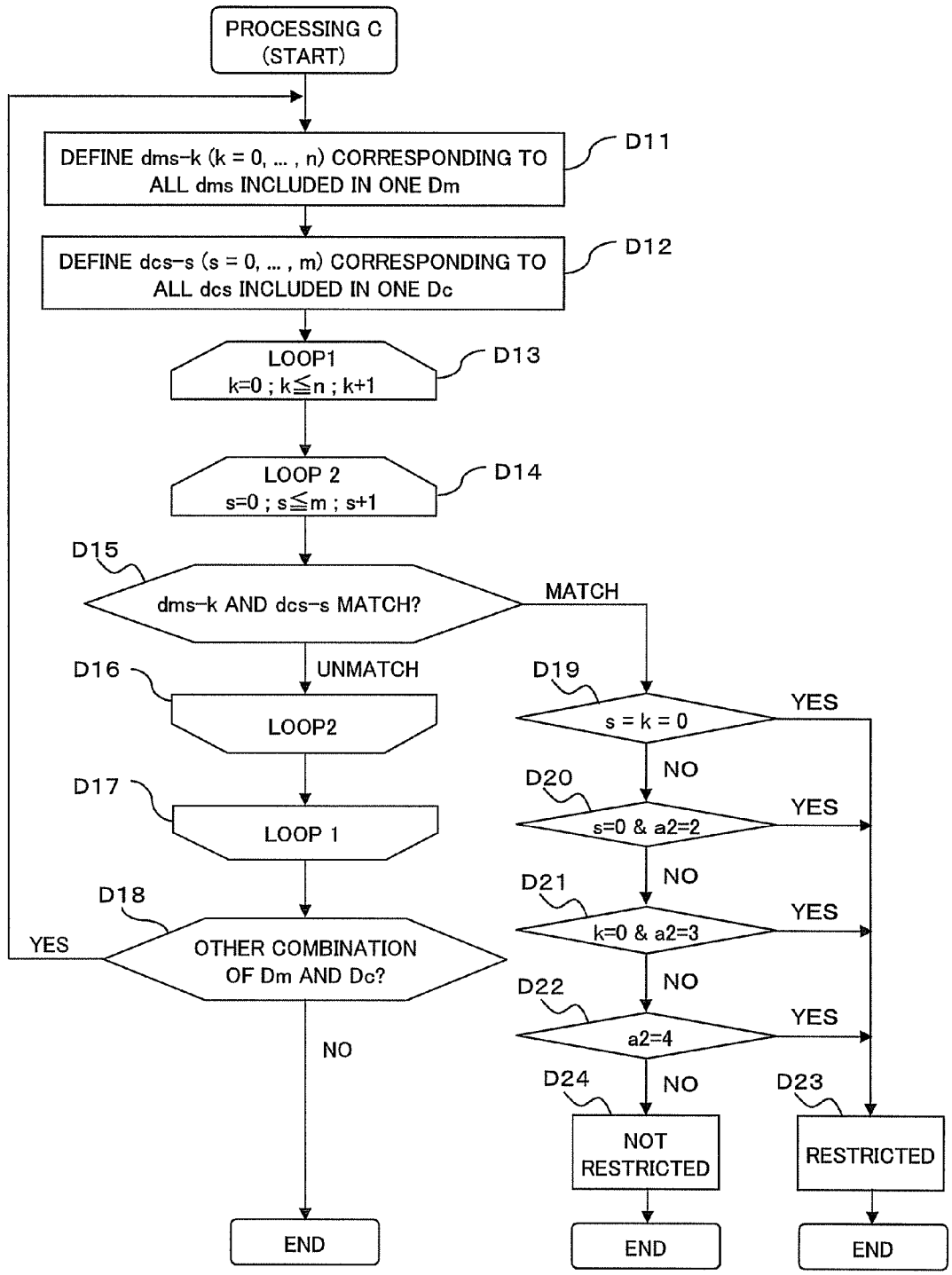
FIG. 14 is a flowchart illustrating a procedure for comparing between management summary information and control summary information by the execution section in the file management system according to one embodiment.

Next, the procedure for comparing between management summary information and control summary information in the file management system according to one embodiment which is configured as set forth previously will be described with reference to the flowchart depicted in FIG. 14 (Steps D11-D24).

Firstly, the execution section 27 retrieves a data sequence of all management summary information dms included in one piece of management information Dm of management information Dm retrieved by the management information retrieval section 25 (the $0^{th}$ generation management summary information dms-0 through the $n^{th}$ generation management summary information dms-n) as a history data sequence, and defines the $k^{th}$ generation management summary information dms-k (k=0, ..., n; k is a variable) corresponding to retrieved all management summary information dms (Step D11).

Next, the execution section 27 retrieves a data sequence of all control summary information dcs included in one piece of control information Dc of control information Dc retrieved by the control information retrieval section 26 (the $0^{th}$ generation control summary information dcs-0 through the $m^{th}$ generation control summary information dcs-m) as a history data sequence, and defines the $s^{th}$ generation control summary information dcs-k (s=0, ..., m; s is a variable) corresponding to retrieved all control summary information dcs (Step D12).

After setting the initial value "0" to the variable k that indicates the generation of $k^{th}$ generation management summary information dms-k, the execution section 27 performs comparison processing between $s^{th}$ generation control summary information dcs-s and $k^{th}$ generation management summary information dms-k (Step D15) and adds the increment "1" to the variable k until the variable k exceeds the last value "n" (Steps D13-D17; LOOP1). At the same time, after setting the initial value "0" to the variable s that indicates generation of the $s^{th}$ generation control summary information dcs-s and the execution section 27 repeats the processing of Step D15 and adds the increment "1" to the variable s until the variable s exudes the last value "m" (Step D14-D16; LOOP2).

That is, the execution section 27 sequentially compares between each of the $0^{th}$ generation management summary information dms-0 through the $n^{th}$ generation management summary information dms-n and each of the $0^{th}$ generation control summary information dcs-0 through the $m^{th}$ generation control summary information dcs-m, and determines whether or not there is management summary information dms that matches to one of the $0^{th}$ generation control summary information dcs-0 through the $m^{th}$ generation control summary information dcs-m.

In the course of Steps D13-D17 described above, when $s^{th}$ generation control summary information dcs-s matches to $k^{th}$ generation management summary information dms-k (see the "match" route in Step D15), the execution section 27 determines whether or not the $k^{th}$ generation management summary information dms-k is restricted on the basis of the variables s and k that indicate the generations of the $s^{th}$ generation control summary information dcs-s and the $k^{th}$ generation management summary information dms-k, and the comparison processing attribute information a2 included in the control information Dc related to the $s^{th}$ generation control summary information dcs-s (Step D19-D24).

That is, when the variables s and k that indicate the generations of the $s^{th}$ generation control summary information dcs-s and the $k^{th}$ generation management summary information dms-k are both "0" (see the "YES" route in Step D19), the execution section 27 determines that the $k^{th}$ generation management summary information dms-k is restricted (Step D23) and the processing is terminated.

Furthermore, when at least one of the variable s and k is not "0" (see the "NO" route in Step D19), the execution section 27 determines that the $k^{th}$ generation management summary information dms-k is restricted (Step D23) if the variable s is "0" and if the number in the comparison processing attribute information a2 included in the file attribute information dcc in the control information Dc related to the $s^{th}$ generation control summary information dcs-s is "2" (see the "YES" route in Step D20), and the processing is terminated.

Furthermore, when the variable s is not "0" or the number in the comparison processing attribute information a2 included in the file attribute information dcc in the control information Dc related to the $s^{th}$ generation control summary information dcs-s is not "2" (see the "NO" route in Step D20), the execution section 27 determines that the $k^{th}$ generation management summary information dms-k is restricted (Step D23) if the variable k is "0" and if the number in the comparison processing attribute information a2 included in the file attribute information dcc in the control information Dc related to the $s^{th}$ generation control summary information dcs-s is "3" (see the "YES" route in Step D21), and the processing is terminated.

Furthermore, when the variable k is not "0" or the number in the comparison processing attribute information a2 included in the file attribute information dcc in the control information Dc related to the $s^{th}$ generation control summary information dcs-s is not "2" (see the "NO" route in Step D21), the execution section 27 determines that the $k^{th}$ generation management summary information dms-k is restricted (Step D23) if the number in the comparison processing attribute information a2 included in the file attribute information dcc in the control information Dc related to the $s^{th}$ generation control summary information dcs-s is "4" (see the "YES" route in Step D22), and the processing is terminated.

Furthermore, when the number in the comparison processing attribute information a2 included in the file attribute information dcc in the control information Dc related to the $s^{th}$ generation control summary information dcs-s is not "4" (see the "NO" route in Step D22), it is determined that the $k^{th}$ generation management summary information dms-k is not restricted (Step D24) and the processing is terminated.

On the other hand, as a result of the repeated processing of Step D13-D17 described above, when there is no management summary information dms that matches to any of the $0^{th}$ generation control summary information dcs-0 through the $m^{th}$ generation control summary information dcs-m (see the "UNMATCH" route in Step D15), the execution section 27 checks whether or not there is any combination of management information Dm and control information Dc that has not undergone the comparison processing (Step D18). The flow returns to Step D11 if there is any combination left (see the "YES" route in Step D18), the processing is terminated if there is no combination that has not undergone the comparison processing (see the "NO" route in Step D18).

As described above, according to the file management system 10 as one embodiment, when file data stored in the file data storage section 22 related to the management summary information dms matches to control summary information dcs related to a file to be blocked, proliferation of information related to the file to be blocked over a network can be blocked by executing one of "DELETION PROCESSING", "READ-DISABLING PROCESSING" and "REPORT PROCESSING" on the file data related to the matched management summary information dms as specified processing.

Furthermore, when one of the $0^{th}$ generation management summary information dms-0 through the $n^{th}$ generation management summary information dms-n matches to one of the $0^{th}$ generation control summary information dcs-0 through the $m^{th}$ generation control summary information dcs-m, in addition to the file to be blocked, proliferation of information on a copied file obtained by modifying the file to be blocked over the network can be blocked by executing one of "DELETION PROCESSING", "READ-DISABLING PROCESSING" and "REPORT PROCESSING" on the file data related to the matched management summary information dms as specified processing.

Furthermore, it is ensured that proliferation of information on the file to be blocked and the copied file over the network can be blocked by executing "DELETION PROCESSING" as specified processing.

(2) Others

Note that the present invention is not restricted to the embodiment described above, and various modifications may be made without departing from the spirit of the present invention.

For example, although an updating event occurs when control information Dc is added in the control information storage section 24 or when file data stored in the file data storage section 22 is rewritten, or when file data is added in the file data storage section 22 in the above embodiment, this is not limiting. For example, a configuration is possible in which an updating event occurs in the management information retrieval section 25 and the control information retrieval section 26 in a terminal apparatus 11 that receives management information Dm (file receiver side) when the terminal apparatus 11 receives the management information Dm from another terminal apparatus 11 (file provider side) via the Internet 12.

Note that, in the following description, the terminal apparatus 11 that receives the management information Dm is referred to as the "receiving terminal apparatus 11R" and another management information Dm that sends it is referred to as the "sending terminal apparatus 11S".

FIG. 15 is a diagram illustrating specified attribute information of control information used in the file management system as a variant of one embodiment, and indicates specified processing definition information b1' defining specified processing attribute information a1'.

In this case, specified processing attribute information a1' contained in file attribute information dcc in control information Dc (not shown) is predefined by specified processing definition information b1', as depicted in FIG. 15.

In the specified processing definition information b1' in the example depicted in FIG. 15, each of the above-described Numbers "1", "2" and "3" are defined by being related to the specified processing names "DELETION", "READ-DISABLING" and "REPORT", Number "4" is defined by being related to the specified processing name "SENDER DELETION", and Number "5" is defined by being related to the specified processing name "SENDER DELAYED DELETION".

Here, "SENDER DELETION" indicates the sender deletion processing that immediately deletes a file in the sender, and "SENDER DELAYED DELETION" indicates the sender delayed deletion processing that temporarily accumulates information that can identify files in the sender into a log and deletes the files in the sender at a time, such as manually or by means of batch processing.

Thereby, one of Number "1", "2", "3", "4" and "5" described above is selected and set to specified processing attribute information a1', for example, and additional information corresponding to the selected number is assigned.

When the receiving terminal apparatus 11R receives management information Dm, the management information retrieval section 25 in the receiving terminal apparatus 11R retrieves the received management information Dm and the control information retrieval section 26 in the receiving terminal apparatus 11R retrieves all control information Dc stored in the control information storage section 24.

Thereafter, when the management information Dm retrieved by the management information retrieval section 25 matches to the control information Dc retrieved by the control information retrieval section 26, the execution section 27 in the receiving terminal apparatus 11R executes one of "SENDER DELETION" and "SENDER DELAYED DELETION" as specified processing on the basis of the specified processing attribute information a1' contained in the file attribute information dcc in the control information Dc.

Figure 16:
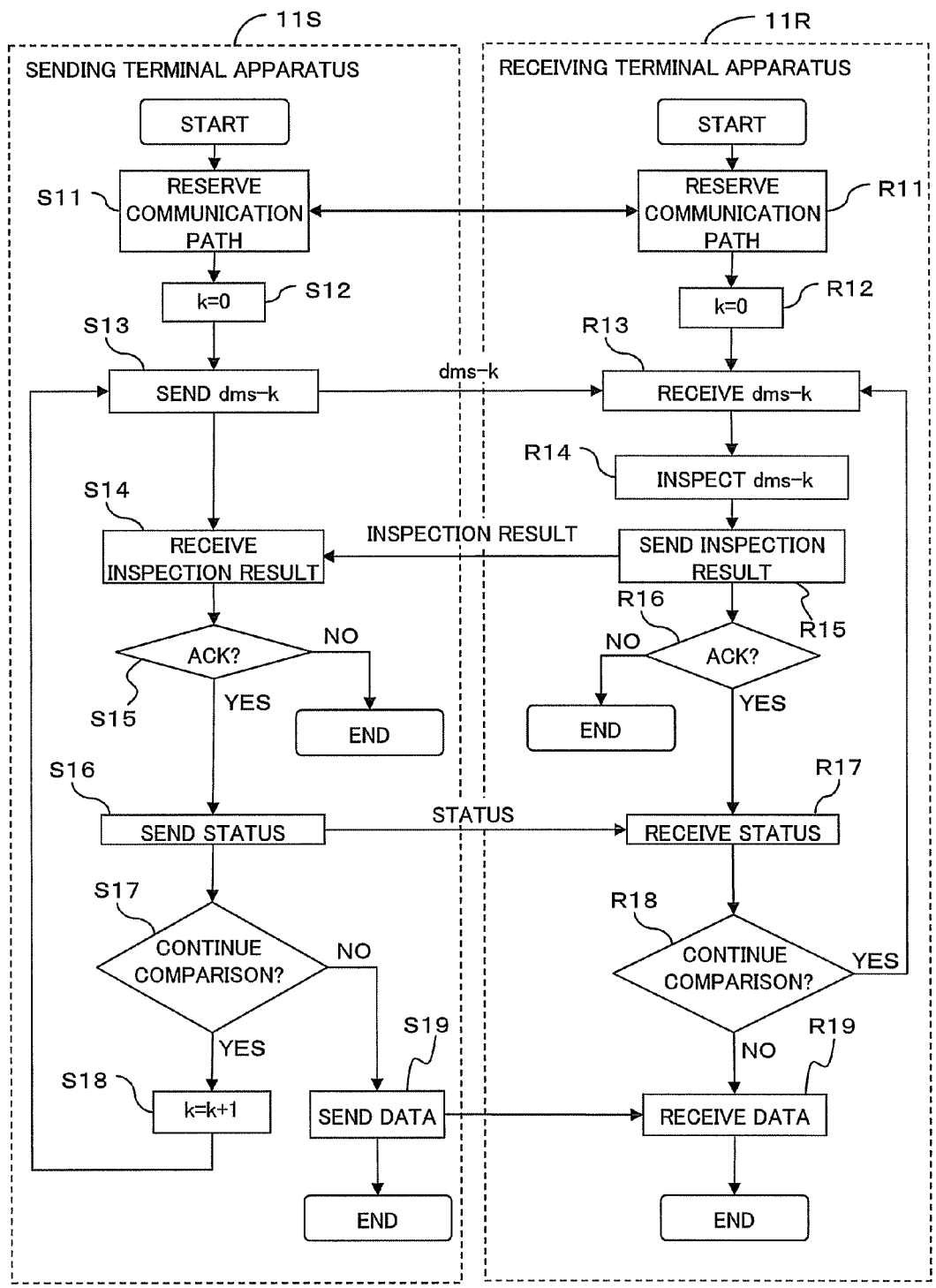
FIG. 16 is a flowchart illustrating a processing procedure for sending file data and management information from a sending terminal apparatus to a receiving terminal apparatus in the file management system according to a variant of one embodiment.

Hereinafter, a processing procedure for sending file data and management information from a sending terminal apparatus to a receiving terminal apparatus in the file management system according to a variant of one embodiment will be described with reference to the flowchart depicted in FIG. 16 (Steps S11-S19 and Steps R11-R19).

Firstly, a user operating the sending terminal apparatus 11S and another user operating the receiving terminal apparatus 11R reserve a communication path between the sending terminal apparatus 11S and the receiving terminal apparatus 11R by communicatively connecting both the sending terminal apparatus 11S and the receiving terminal apparatus 11R to the Internet 12 (Step S11 and Step R11). Note that, in this case, the sending terminal apparatus 11S may send information including comparison processing attribute information a2 to the receiving terminal apparatus 11R.

Next, the sending terminal apparatus 11S and the receiving terminal apparatus 11R respectively set the initial value "0" to the variable k that indicates the generation of the $k^{th}$ generation management summary information dms-k (k is a variable) related to file data to be sent (hereinafter, referred to as "transmission file data") (Step S12 and Step R12).

The sending terminal apparatus 11S then sends the $k^{th}$ generation management summary information dms-k related to the transmission file data to the receiving terminal apparatus 11R (Step S13), and waits until an inspection result (check result) that will be described later from the receiving terminal apparatus 11R.

The receiving terminal apparatus 11R, in response to receiving the $k^{th}$ generation management summary information dms-k (Step R13), executes comparison processing between the $k^{th}$ generation management summary information dms-k and all control summary information dcs stored in the control information storage section 24, and determines whether or not there is control summary information dcs that matches to the $k^{th}$ generation management summary information dms-k (Step R14).

If there is control summary information dcs that matches to the $k^{th}$ generation management summary information dms-k, the receiving terminal apparatus 11R sends an "NACK" that indicates that there is control summary information dcs that matches to the $k^{th}$ generation management summary information dms-k as an inspection result to the sending terminal apparatus 11S (Step R15). The sending terminal apparatus 11S receives the "NACK" (Step S14).

On the other hand, if there is no control summary information dcs that matches to the $k^{th}$ generation management summary information dms-k, the receiving terminal apparatus 11R sends an "ACK" that indicates that there is no control summary information dcs that matches to the $k^{th}$ generation management summary information dms-k as an inspection result to the sending terminal apparatus 11S (Step R15). The sending terminal apparatus 11S receives the "ACK" (Step S14).

When the receiving terminal apparatus 11R sends the "NACK" as the inspection result (see the "NO" route in Step R16), the processing is terminated without the receiving terminal apparatus 11R receiving the transmission file data.

On the other hand, when the receiving terminal apparatus 11R sends the "ACK" as the inspection result (see the "YES" route in Step R16), the receiving terminal apparatus 11R waits until a status that will be described later from the sending terminal apparatus 11S.

Furthermore, when the sending terminal apparatus 11S receives the "NACK" as the inspection result (see the "NO" route in Step S15), the processing is terminated without the sending terminal apparatus 11S sending the transmission file data. Here, if the specified processing attribute information a1' included in the file attribute information dcc in the control information Dc related to the matched control summary information dcs indicates "4", the execution section 27 in the sending terminal apparatus 11S deletes transmission file data stored in the file data storage section 22 in the sending terminal apparatus 11S (sender file data).

On the other hand, when the sending terminal apparatus 11S receives the "ACK" as the inspection result (see the "YES" route in Step S15), the sending terminal apparatus 11S determines whether or not there is any management summary information dms that has not undergone the comparison processing.

When there is management summary information dms that has not undergone the comparison processing, the sending terminal apparatus 11S sends the status "YES" indicating that there is management summary information dms that has not undergone the comparison processing to the receiving terminal apparatus 11R (Step S16). The receiving terminal apparatus 11R receives the status "YES" (Step R17).

On the other hand, when there is not management summary information dms left that has not undergone the comparison processing, the sending terminal apparatus 11S sends the status "NO" indicating that there is no management summary information dms left that has not undergone the comparison processing to the receiving terminal apparatus 11R (Step S16). The receiving terminal apparatus 11R receives the status "NO" (Step R17).

When the sending terminal apparatus 11S sends the status "YES" (see the "YES" route in Step S17), the sending terminal apparatus 11S add the increment "1" to the variable k (Step S18) and the flow returns to the processing in Step S13.

On the other hand, when the sending terminal apparatus 11S sends the status "NO" (see the "NO" route in Step S17), the sending terminal apparatus 11S sends the transmission file data to the receiving terminal apparatus 11R (Step S19) and the processing is terminated.

Furthermore, when the receiving terminal apparatus 11R receives the status "YES" (see the "YES" route in Step R18), the flow returns to the processing in Step S13.

On the other hand, when the receiving terminal apparatus 11R receives the status "NO" (see the "NO" route in Step R18), the receiving terminal apparatus 11R receives the transmission file data from the sending terminal apparatus 11S (Step R19) and the processing is terminated.

Note that although examples in which the Internet 12 is used as one example of network have been described in above embodiments, this is not limiting. Various known networks, such as intranets, extranets, LANs (Local Area Networks) may be used.

Furthermore, although specified processing is executed on file data in the above embodiments, this is not limiting. The specified processing may be executed on the entire file including management information Dm.

Furthermore, although one specified processing among three types of specified processing, namely, "DELETION", "READ-DISABLING" and "REPORT", is executed in the above embodiments, this is not limiting. The processing in combination of "DELETION", "READ-DISABLING" and "REPORT" may be executed as the specified processing.

Furthermore, although file data is stored in the file data storage section 22 and management information Dm is stored in the management information storage section 23 in the above embodiments, this is not limiting. File data and the management information Dm may be stored into a single storage area.

Furthermore, although examples in which the HDD 15 in the terminal apparatus 11 functions as the control information storage section 24 have been described in the above embodiments, this is not limiting. For example, the configuration is possible in which the storage device 28 in the server 13 may function as the control information storage section 24 and the storage device 28 may be accessed via the Internet 12 every time an updating event occurs in the terminal apparatus 11.

Furthermore, although file attribute information dcc includes a combination of an integer value and a string in the above embodiments, this is not limiting. File attribute information dcc may include string data in an arbitrary length.

Furthermore, although one of "DELETION", "READ-DISABLING" and "REPORT" is executes as specified processing in the above embodiments, this is not limiting. Any known various types of processing that can block distribution of information on a file to be blocked may be executed as the specified processing.

Furthermore, although examples in which the terminal apparatus 11 is connected online to the server 13 and the terminal apparatus 11 updates control information Dc with reference to update control information Du have been described in the above embodiments, this is not limiting. For example, a predetermined authority, such as a block information provider, may periodically send a storage medium and control information Dc may be updated manually by an operator. In addition, the terminal apparatus 11 may not include a control information storage section 24, and update control information Du may be used as control information Dc.

Furthermore, although examples in which an updating event occurs in response to file data being added in the file data storage section 22 have been described in the above embodiments, this is not limiting. For example, an updating event may occur in response to addition of a new file data storage section 22' (not shown), such as when a file system is mounted. In this case, the management information retrieval section 25 may retrieve management information Dm corresponding to each of all file data stored in the added file data storage section 22'.

FIG. 17 is a diagram schematically illustrating an example of the structures of management summary information and control summary information used in the file management system according to a variant of one embodiment.

Furthermore, although examples in which a digest of file data is used as management summary information and control summary information have been described in the above embodiments, this is not limiting. For example, as depicted in FIG. 17, in addition to the digest (see the item "ACTUAL DIGEST SEQUENCE" depicted in FIG. 17), the content of file data for identifying a key word (see the item "KEY WORD" depicted in FIG. 17) may be set. Thereby, mistaken blocking of information that is not related to a file to be blocked can be prevented when there is an accidental match of the digest of the file data.

The CPU 16 in the terminal apparatus 11 is adapted to function as the management information retrieval section 25, the control information retrieval section 26, and the execution section 27 by executing a file management program.

Note that programs (file management program) for implementing the functions as the management information retrieval section 25, the control information retrieval section 26, and the execution section 27 are provided in the form of programs recorded on a computer readable recording medium, such as, for example, a flexible disk, a CD (e.g., CD-ROM, CD-R, CD-RW), a DVD (e.g., DVD-ROM, DVD-RAM, DVD-R, DVD+R, DVD-RW, DVD+RW), a magnetic disk, an optical disk, a magneto-optical disk, or the like. The computer then reads a program from that storage medium and uses that program after transferring it to the internal storage apparatus or external storage apparatus or the like. Alternatively, the program may be recoded on a storage device (storage medium), for example, a magnetic disk, an optical disk, a magneto-optical disk, or the like, and the program may be provided from the storage device to the computer through a communication path.

Upon implementing the functions as the management information retrieval section 25, the control information retrieval section 26, and the execution section 27, the program stored in an internal storage device is executed by a microprocessor in the computer. In this case, the computer may alternatively read a program stored in the storage medium for executing it.

Note that, in this embodiment, the term "computer" may be a concept including hardware and an operating system, and may refer to hardware that operates under the control of the operating system. Alternatively, when an application program alone can make the hardware to be operated without requiring an operating system, the hardware itself may represent a computer. The hardware includes at least a microprocessor, e.g., CPU, and a means for reading a computer program recorded on a storage medium and, in this embodiment, the terminal apparatus 11 includes a function as a computer.

Furthermore, in this embodiment, as the storage medium other than a flexible disk, a CD, a DVD, a magnetic disk, an optical disk, or a magneto-optical disk, an IC card, a ROM cartridge, a magnetic tape, a punch card, an internal storage device (memory, such as a RAM or ROM) of the computer, an external storage device or the like, or any medium that is readable by the computer, including a printed medium having a code, such as a bar code, is printed thereon, may be used.

The embodiment includes at least one of the following advantages:

(1) Proliferation of an important file distribution of which should be restricted over a network can be blocked.

(2) Proliferation of a copied file obtained by modifying the important file distribution of which should be restricted over a network can be blocked.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A file management system comprising:
a file data storage section that stores file data of a file;
a management information storage section that stores management information identifying the file, the management information being related to the file data;
a control information storage section that stores control information on a file to be blocked on which a predefined specified processing is to be executed;
a management information retrieval section that retrieves the management information stored in the management information storage section;
a control information retrieval section that retrieves the control information stored in the control information storage section; and
an execution section that, when the management information retrieved by the management information retrieval section corresponds to the control information retrieved by the control information retrieval section, executes the predefined processing on the file data related to that management information, wherein
the management information retrieval section retrieves, when the control information is added in the control information storage section, all of the management information stored in the management information storage section, the control information retrieval section retrieves, when the control information is added in the control information storage section, the added control information, and
the execution section sequentially compares between the management information retrieved by the management information retrieval section and the control information retrieved by the control information retrieval section; and
a processor to provide at least one of the management information retrieval section, the control information retrieval section and the execution section.

2. The file management system according to claim 1, wherein the execution section executes, as the predefined processing, one of deletion processing that deletes the file data from the file data storage section, read-disabling processing that disables reading of the file data, report processing that reports to a sender of the file data, sender deletion processing that deletes the file data in the sender, and sender delayed deletion processing that temporarily accumulates information for identifying the file data in the sender into a log and deletes the file data in the sender at a time.

3. The file management system according to claim 1, wherein
the management information retrieval section retrieves, when the file data stored in the file data storage section is rewritten, the management information related to the rewritten file data,
the control information retrieval section retrieves, when the file data stored in the file data storage section is rewritten, all of the control information stored in the control information storage section, and
the execution section sequentially compares between the management information retrieved by the management information retrieval section and the control information retrieved by the control information retrieval section.

4. The file management system according to claim 1, wherein
the management information retrieval section retrieves, when the file data added in the file data storage section, the management information related to the added file data,
the control information retrieval section retrieves, when the file data is added in the file data storage section, all of the control information stored in the control information storage section, and
the execution section sequentially compares between the management information retrieved by the management information retrieval section and the control information retrieved by the control information retrieval section.

5. The file management system according to claim 1, wherein
the file data storage section stores complex file data having a plurality of the file data, and
the execution section executes, when the management information retrieved by the management information retrieval section corresponds to the control information retrieved by the control information retrieval section, the predefined processing on the file data related to that management information.

6. The file management system according to claim 1, wherein
the management information has management summary information indicating a summary of the file data, and
the control information has control summary information indicating a summary of file data of the file to be blocked.

7. The file management system according to claim 6, wherein
the management information has a plurality of pieces of the management summary information when the file data is rewritten one or more times, each piece corresponding to each generation of the rewritten file data,
the control information has a plurality pieces of the control summary information when file data of the file to be blocked is rewritten one or more times, each piece corresponding to each generation of the rewritten file data of the file to be blocked, and
the execution section executes, when one of the plurality of pieces of the management summary information retrieved by the management information retrieval section matches or substantially matches with one of the plurality of pieces of the control summary information retrieved by the control information retrieval section, the predefined processing on the file data related to the piece of management summary information.

8. A file management apparatus comprising:
a file data storage section that stores file data of a file; a management information storage section that stores management information identifying the file, the management information being related to the file data;
a management information retrieval section that retrieves the management information stored in the management information storage section;
a control information retrieval section that retrieves control information on a file to be blocked on which a predefined specified processing is to be executed;
an execution section that, when the management information retrieved by the management information retrieval section corresponds to the control information retrieved by the control information retrieval section, executes the predefined processing on the file data related to that management information, wherein the management information retrieval section retrieves, when the control information is added in a control information storage section that stores control information, all of the management information stored in the management information storage section, the control information retrieval section retrieves, when the control information is added in the control information storage section, the added control information, and the execution section sequentially compares between the management information retrieved by the management information retrieval section and the control information retrieved by the control information retrieval section; and a processor to provide at least one of the management information retrieval section, the control information retrieval section and the execution section.

9. The file management apparatus according to claim 8, wherein the execution section executes, as the predefined processing, one of deletion processing that deletes the file data from the file data storage section, read-disabling processing that disables reading of the file data, report processing that reports to a sender of the file data, sender deletion processing that deletes the file data in the sender, and sender delayed deletion processing that temporarily accumulates information for identifying the file data in the sender into a log and deletes the file data in the sender at a time.

10. The file management apparatus according to claim 8, wherein the management information has management summary information indicating a summary of the file data, and the control information has control summary information indicating a summary of file data of the file to be blocked.

11. The file management apparatus according to claim 10, wherein the management information has a plurality of pieces of the management summary information when the file data is rewritten one or more times, each piece corresponding to each generation of the rewritten file data, the control information has a plurality pieces of the control summary information when file data of the file to be blocked is rewritten one or more times, each piece corresponding to each generation of the rewritten file data of the file to be blocked, and the execution section executes, when one of the plurality of pieces of the management summary information retrieved by the management information retrieval section matches or substantially matches with one of the plurality of pieces of the control summary information retrieved by the control information retrieval section, the predefined processing on the file data related to the piece of management summary information.

12. A computer readable storage recording medium having a file management program recorded thereon that makes a computer comprising a file data storage section that stores file data of a file, to execute a function to manage the file, the file management program making the computer to function as:

a management information retrieval section that retrieves management information for identifying the file from a management information section;

a control information retrieval section that retrieves control information on a file to be blocked on which a predefined specified processing is to be executed;

an execution section that, when the management information retrieved by the management information retrieval section corresponds to the control information retrieved by the control information retrieval section, executes the predefined processing on the file data related to that management information, wherein the management information retrieval section retrieves, when the control information is added in a control information storage section that stores control information, all of the management information stored in the management information storage section, the execution section sequentially compares between the management information retrieved by the management information retrieval section and the control information retrieved by the control information retrieval section.

13. The computer readable recording medium according to claim 12 having a file management program recorded thereon, wherein the file management program makes the computer to function such that the execution section executes, as the predefined processing, one of deletion processing that deletes the file data from the file data storage section, read-disabling processing that disables reading of the file data, report processing that reports to a sender of the file data, sender deletion processing that deletes the file data in the sender, and sender delayed deletion processing that temporarily accumulates information for identifying the file data in the sender into a log and deletes the file data in the sender at a time.

14. The computer readable recording medium according to claim 12 having a file management program recorded thereon, wherein the management information has management summary information indicating a summary of the file data, and the control information has control summary information indicating a summary of file data of the file to be blocked.

15. The computer readable storage medium according to claim 14 having a file management program recorded thereon, the program makes a computer to function such that the management information has a plurality of pieces of the management summary information when the file data is rewritten one or more times, each piece corresponding to each generation of the rewritten file data, the control information has a plurality pieces of the control summary information when file data of the file to be blocked is rewritten one or more times, each piece corresponding to each generation of the rewritten file data of the file to be blocked, and the execution section executes, when one of the plurality of pieces of the management summary information retrieved by the management information retrieval section matches or substantially matches with one of the plurality of pieces of the control summary information retrieved by the control information retrieval section, the predefined processing on the file data related to the piece of management summary information.

* * * * *

UNITED STATES PATENT AND TRADEMARK OFFICE
CERTIFICATE OF CORRECTION

| | | |
|---|---|---|
| PATENT NO. | : 8,131,761 B2 | Page 1 of 1 |
| APPLICATION NO. | : 12/646260 | |
| DATED | : March 6, 2012 | |
| INVENTOR(S) | : Takahiro Masuda | |

It is certified that error appears in the above-identified patent and that said Letters Patent is hereby corrected as shown below:

Column 26, Line 40, In Claim 7, after "plurality" insert -- of --.

Column 27, Line 42, In Claim 11, after "plurality" insert -- of --.

Column 28, Line 47, In Claim 15, after "plurality" insert -- of --.

Signed and Sealed this
Twenty-ninth Day of May, 2012

David J. Kappos
*Director of the United States Patent and Trademark Office*